US012425572B2

United States Patent
Chen et al.

(10) Patent No.: US 12,425,572 B2
(45) Date of Patent: Sep. 23, 2025

(54) LOCAL ILLUMINATION COMPENSATION

(71) Applicant: Tencent America LLC, Palo Alto, CA (US)

(72) Inventors: Lien-Fei Chen, Hsinchu (TW); Xin Zhao, Santa Clara, CA (US); Guichun Li, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 34 days.

(21) Appl. No.: 18/240,950

(22) Filed: Aug. 31, 2023

(65) Prior Publication Data

US 2024/0137487 A1 Apr. 25, 2024
US 2024/0236297 A9 Jul. 11, 2024

Related U.S. Application Data

(60) Provisional application No. 63/417,923, filed on Oct. 20, 2022.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/70* (2014.11)

(58) Field of Classification Search
CPC .. H04N 19/105; H04N 19/117; H04N 19/132; H04N 19/176; H04N 19/186; H04N 19/61; H04N 19/70; H04N 19/82

(Continued)

(56) References Cited

U.S. PATENT DOCUMENTS

2019/0068989 A1\* 2/2019 Lee ................... H04N 19/537
2019/0342546 A1\* 11/2019 Lin ................... H04N 19/593
(Continued)

FOREIGN PATENT DOCUMENTS

WO WO-2022178433 A1 \* 8/2022 ............. H04N 19/51

OTHER PUBLICATIONS

International Search Report with Written Opinion issued Jan. 9, 2024 in Application No. PCT/US2023/073480, pp. 1-21.

*Primary Examiner* — Behrooz M Senfi
(74) *Attorney, Agent, or Firm* — ARENTFOX SCHIFF LLP

(57) ABSTRACT

Processing circuitry for video decoding receives coded information of a current block in a current picture from a coded video bitstream, the coded information is indicative of applying local illumination compensation (LIC) on the current block in the current picture. The processing circuitry derives, parameters of an LIC model, according to a first template of a current block and a second template of a reference block in a reference picture. The reference block is pointed based on a motion vector for the current block. The first template includes a subset of reconstructed neighboring samples that are above and left to the current block, and the second template includes collocated samples to the subset of the reconstructed neighboring samples. The processing circuitry applies the LIC model on the current block according to the reference block to generate compensated samples of the current block.

20 Claims, 13 Drawing Sheets

(51) Int. Cl.
*H04N 19/176* (2014.01)
*H04N 19/70* (2014.01)

(58) Field of Classification Search
USPC .................................................. 375/240.02
See application file for complete search history.

(56) References Cited

U.S. PATENT DOCUMENTS

2021/0385446 A1* 12/2021 Liu ..................... H04N 19/70
2022/0007011 A1* 1/2022 Ma ..................... H04N 19/186
2022/0312004 A1 9/2022 Auyeung et al.

* cited by examiner

LOCAL ILLUMINATION COMPENSATION

INCORPORATION BY REFERENCE

The present application claims the benefit of priority to U.S. Provisional Application No. 63/417,923, "Improvement of Local Illumination Compensation" filed on Oct. 20, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry. The processing circuitry receives coded information of a current block in a current picture from a coded video bitstream, the coded information is indicative of applying local illumination compensation (LIC) on the current block in the current picture. The processing circuitry derives, parameters of an LIC model, according to a first template (also referred to as first subset template) of a current block and a second template (also referred to as second subset template) of a reference block in a reference picture. The reference block is pointed based on a motion vector for the current block. The first template includes a subset of reconstructed neighboring samples that are above and left to the current block, and the second template includes collocated samples to the subset of the reconstructed neighboring samples. The processing circuitry applies the LIC model on the current block according to the reference block to generate compensated samples of the current block.

In some examples, the first template includes a row of the reconstructed neighboring samples that are immediately above the current block. In some examples, the first template comprises a column of the reconstructed neighboring samples that are immediately left to the current block. In some examples, the first template includes one or more rows of the reconstructed neighboring samples that are above the current block. In some examples, the first template comprises one or more columns of the reconstructed neighboring samples that are left to the current block.

In some examples, the processing circuitry decodes a syntax that indicates the first template for selection from a plurality of template candidates. In some examples, the processing circuitry determines to use the first template to derive the parameters of the LIC model according to at least one of a size of the current block, a shape of the current block, an aspect ratio of the current block, or the reconstructed neighboring samples.

According to an aspect of disclosure, the processing circuitry receives coded information of a current block in a current picture from a coded video bitstream, the coded information is indicative of applying local illumination compensation (LIC). The processing circuitry determines, based on a motion vector for the current block, a reference block in a reference picture and classifies samples in a first block into at least a first class and a second class according to a classification criterion. The first block is one of the current block and the reference block, samples in a second block are classified according to collocated samples in the first block, the second block is another one of the current block and the reference block. The processing circuitry classifies template samples for the first block into at least the first class and the second class according to the classification criterion, template samples for the second block are classified according to corresponding collocates template samples for the first block. The processing circuitry derives first parameters of a first LIC model according to the first class of the template samples for the first block and the first class of the template samples for the second block, and derives, second parameters of a second LIC model according to the second class of the template samples for the first block and the second class of the template samples for the second block. The processing circuitry applies the first LIC model to the first class of samples in the current block and the second LIC model to the second class of samples in the current block to generate compensated samples of the current block.

In some examples, the first LIC model and the second LIC model have at least one different parameter value.

In some examples, the processing circuitry determines an amplitude threshold based on an average of sample values in the first block, and classifies a sample into the first class or the second class based on a comparison of the sample with the amplitude threshold.

In some examples, the processing circuitry determines a gradient threshold based on gradient values of samples in the first block, and classifies a sample into the first class or the second class based on a comparison of a gradient value of the sample with the gradient threshold.

In some examples, the processing circuitry derives the first parameters of the first LIC model and the second parameters of the second LIC model according to at least one of a least-mean-square operation and an autocorrelation matrix with LDL decomposition operation.

In some examples, the processing circuitry decodes a syntax indicative of applying more than one LIC model to generate the compensated samples of the current block.

According to an aspect of the disclosure, the processing circuitry receives coded information of a current block in a current picture from a coded video bitstream, the coded information is indicative of applying local illumination compensation (LIC). The processing circuitry derives, parameters of an LIC model, according to a first template of a current block and a second template of a reference block in a reference picture. The reference block is pointed based on a motion vector for the current block, the LIC model is different from a linear model that is based on an amplitude of a single reference sample. The processing circuitry applies the LIC model on the current block according to the reference block to generate compensated samples of the current block.

In some examples, the LIC model includes a non-linear term.

In some examples, the LIC model includes an n-tap spatial domain filter, and n is greater than 1. The n-tap spatial domain filter has a filter shape of at least one of a cross shape, a diamond shape, and a square shape. In an example, the processing circuitry performs a mean square error minimization according to the first template of the current block and the second template of the reference block to calculate filter coefficients of the n-tap spatial domain filter.

In some examples, the LIC model includes a gradient term that is linearly based on a gradient of a reference sample.

In some examples, the processing circuitry decodes a syntax that is indicative of the LIC model for selection from a plurality of LIC model candidates.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 13A-13C show examples of filter shapes in some embodiments.

DETAILED DESCRIPTION OF EMBODIMENTS

Figure 1:
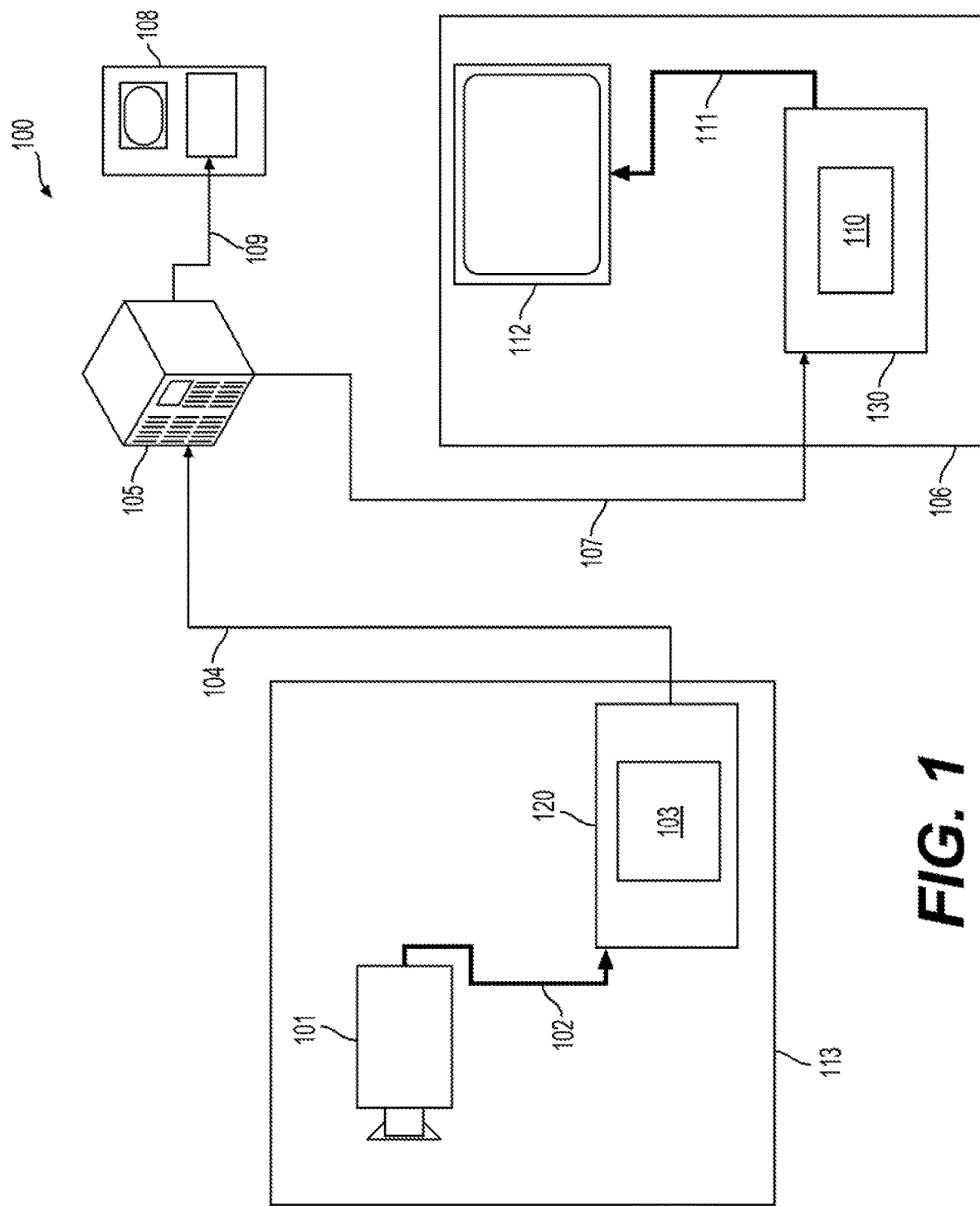
FIG. 1 is a schematic illustration of an exemplary block diagram of a communication system.

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
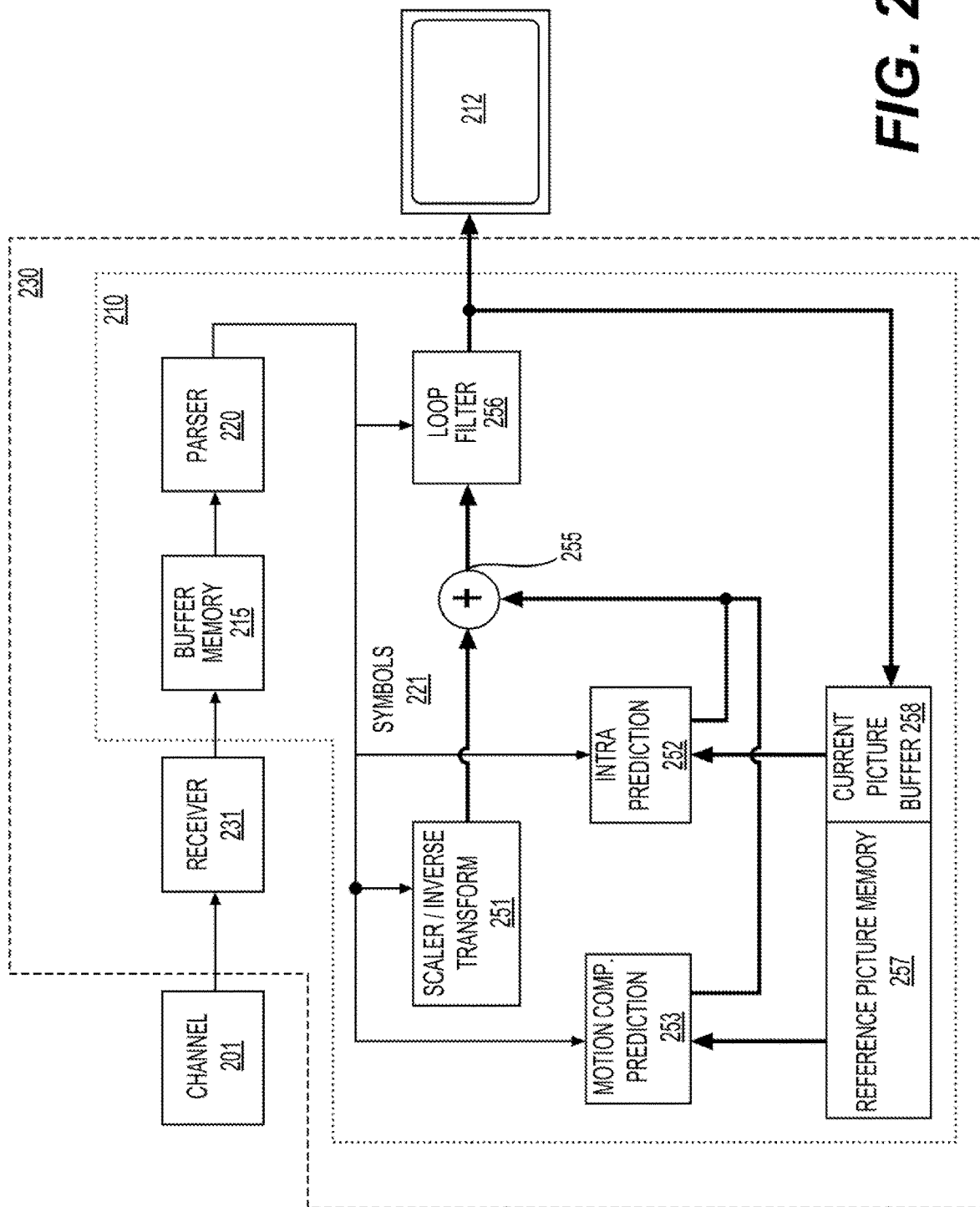
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
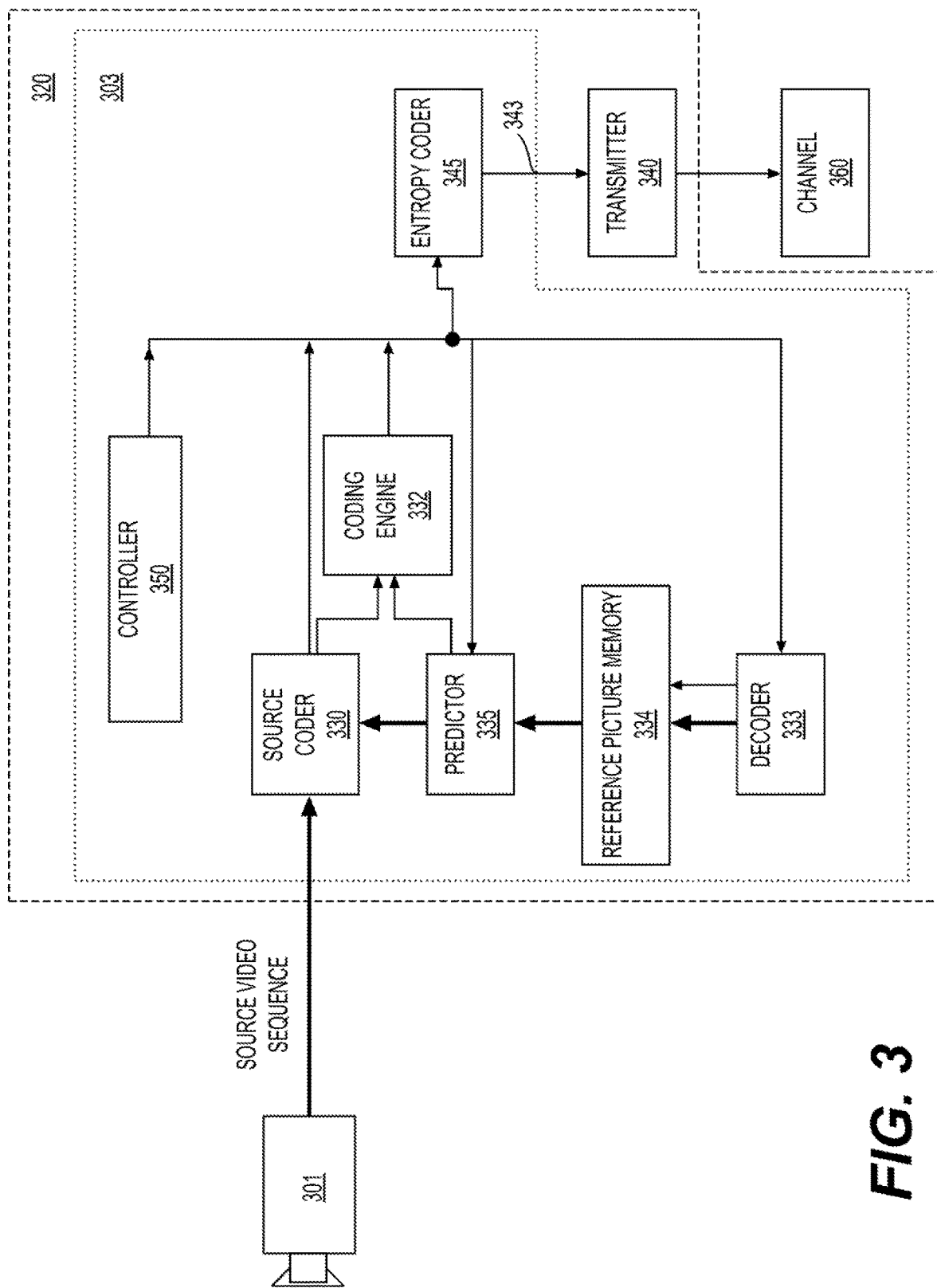
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide further techniques that can be used with an inter prediction technique referred to as local illumination compensation (LIC), and improve coding performance.

Various inter prediction modes can be used in video coding. For example, in VVC, for an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CLIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4.

Figure 4:
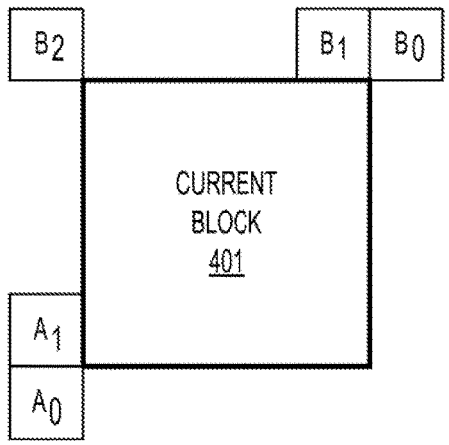
FIG. 4 shows positions of spatial merge candidates according to an embodiment of the disclosure.

FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information.

Figure 5:
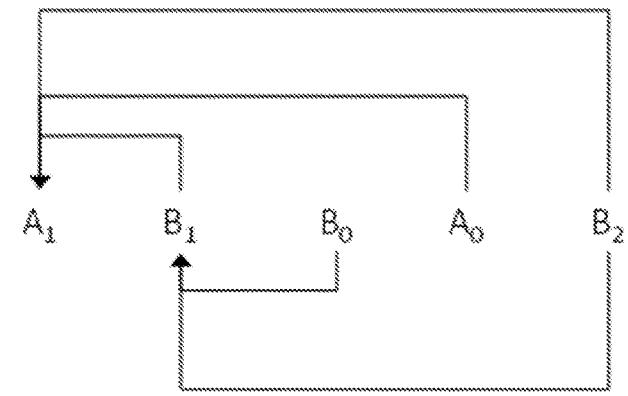
FIG. 5 shows candidate pairs that are considered for a redundancy check of spatial merge candidates according to an embodiment of the disclosure.

FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 6:
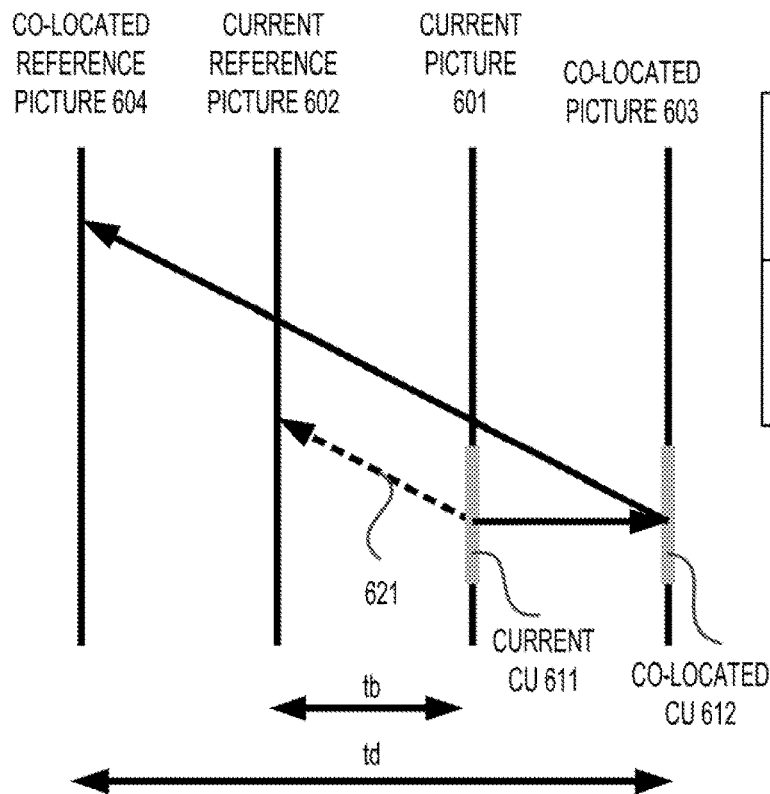
FIG. 6 shows exemplary motion vector scaling for a temporal merge candidate.

In an embodiment, temporal candidate(s) are derived as follows. In an example, only one temporal merge candidate is added to the candidate list. FIG. 6 shows exemplary motion vector scaling for a temporal merge candidate. To derive the temporal merge candidate of a current CU (611) in a current picture (601), a scaled MV (621) (e.g., shown by a dotted line in FIG. 6) can be derived based on a co-located CU (612) belonging to a collocated reference picture (604). A reference picture list used to derive the co-located CU (612) can be explicitly signaled in a slice header. The scaled MV (621) for the temporal merge candidate can be obtained as shown by the dotted line in FIG. 6. The scaled MV (621) can be scaled from the MV of the co-located CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the co-located picture (603) and the co-located picture (603). A reference picture index of the temporal merge candidate can be set to zero.

Figure 7:
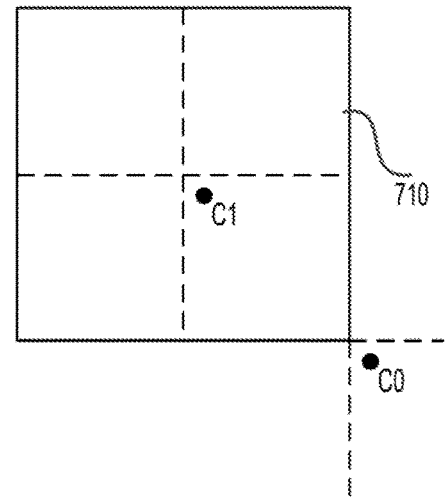
FIG. 7 shows exemplary candidate positions for a temporal merge candidate of a current CU.

FIG. 7 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, inter coded, and in the current row of CTUs, the candidate position C0 is used to derive the temporal merge candidate.

In some examples, local illumination compensation (LIC) is used as an inter prediction technique to model local illumination variation between a current block and a prediction block (also referred to as reference block) of the current block by using a linear function. The prediction block is in a reference picture, and can be pointed by motion vector (MV). The parameters of the linear function can include a scale $\alpha$ and an offset $\beta$, and the linear function can be represented by $\alpha \times p[x, y] + \beta$ to compensate illumination changes, where p[x, y] denotes a reference sample at a location [x, y] in the reference block (also referred to as prediction block), the reference block is pointed to by MV. In some examples, the scale $\alpha$ and the offset $\beta$ can be derived based on a template of the current block and a corresponding reference template of the reference block by using the least square method, thus no signaling overhead is required, except that an LIC flag may be signaled to indicate the use of LIC.

In some examples, LIC is used for uni-prediction inter CUs. In some examples, intra neighbor samples (neighboring samples that are predicted using intra prediction) of the current block can be used in LIC parameter derivation. In some examples, LIC is disabled for blocks with less than 32 luma samples. In some examples, for non subblock modes (e.g., non affine modes), LIC parameter derivation is performed based on the template block samples of the current CU, instead of partial template block samples for the first top-left 16×16 unit. In some examples, LIC parameter derivation is performed based on partial template block samples, such as the partial template block samples for the first top-left 16×16 unit. In some examples, template samples of the reference block are determined by using motion compensation (MC) with the MV of the block without rounding it to integer-pel precision.

Some aspects of the disclosure provide techniques to provide adjustments to LIC, thus LIC can be flexibly adjusted for various scenarios, and thus can improve the accuracy of the illuminance compensation when the LIC is enabled. In some examples, the techniques for the adjustments of LIC can include features that are similarly used in other model derivation based prediction mode, such as features in cross component intra prediction modes and the like.

The cross component intra prediction modes can include a first technique referred to as cross component linear model (CCLM), a second technique referred to as multi-model linear model (MMLM), a third technique referred to as convolutional cross-component model (CCCM), and a fourth technique referred to as gradient linear model (GLM).

In some examples (e.g., VVC), the first technique CCLM is used to reduce the cross-component redundancy. In the CCLM, the chroma samples are predicted based on the reconstructed luma samples of the same CU by using a linear model, such as using Eq. (1):

$$\text{pred}_C(i,j) = a \cdot \text{rec}_L'(i,j) + b \qquad \text{Eq. (1)}$$

where $\text{pred}_C(i, j)$ represents the predicted chroma samples in a CU and $\text{rec}_L'(i, j)$ represents the downsampled reconstructed luma samples of the same CU. The CCLM linear model includes parameters (a and b) that can be derived, in an example, with at most four neighbouring chroma samples and their corresponding down-sampled luma samples.

In some examples, based on the location of the neighboring chroma samples, CCLM can include different modes that is referred to as LM_T (LM top mode or above mode LM_A), LM_L (LM left mode) and LM_LT (LM left top mode or left above mode LM_LA or just LM mode). For example, the dimensions of the current chroma block are W×H, then W' and H' can be set for various modes in CCLM. When LM mode (also referred to as LM_LT or LM_LA) is applied W'=W, H'=H; when LM-A mode is applied W'=W+H; when LM-L mode is applied H'=H+W.

The above neighbouring positions are denoted as S[0, −1] . . . S[W'−1, −1] and the left neighbouring positions are denoted as S[−1, 0] . . . S[−1, H'−1]. Then, four positions are selected. For example, when LM mode is applied and both above and left neighbouring samples are available, the four positions can include S[W'/4, −1], S[3*W'/4, −1], S[−1, H'/4] and S[−1, 3*H'/4]; when LM_A mode is applied or only the above neighbouring samples are available, the four positions can include S[W'/8, −1], S[3*W'/8, −1], S[5*W'/8, −1] and S[7*W'/8, −1]; when LM-L mode is applied or only the left neighbouring samples are available, the four positions can include S[−1, H'/8], S[−1, 3*H'/8], S[−1, 5*H'/8] and S[−1, 7*H'/8].

The four neighbouring luma samples at the selected positions are down-sampled and compared to find two larger values denoted by $x^0_A$ and $x^1_A$, and two smaller values denoted by $x^0_B$ and $x^1_B$. The corresponding chroma sample values are denoted as $y^0_A$, $y^1_A$, $y^0_B$ and $y^1_B$. Then, intermediate parameters $X_a$, $X_b$, $Y_a$ and $Y_b$ are derived as:

$$X_a=(x^0_A+x^1_A+1)>>1;\ X_b=(x^0_B+x^1_B+1)>>1;\ Y_a=(y^0_A+y^1_A+1)>>1;\ Y_b=(y^0_B+y^1_B+1)>>1;$$

Finally, the linear model parameters a and b are obtained according to Eq. (2) and Eq. (3):

$$a = \frac{Y_a - Y_b}{X_a - X_b} \qquad \text{Eq. (2)}$$

$$b = Y_b - a \cdot X_b \qquad \text{Eq. (3)}$$

Figure 8:
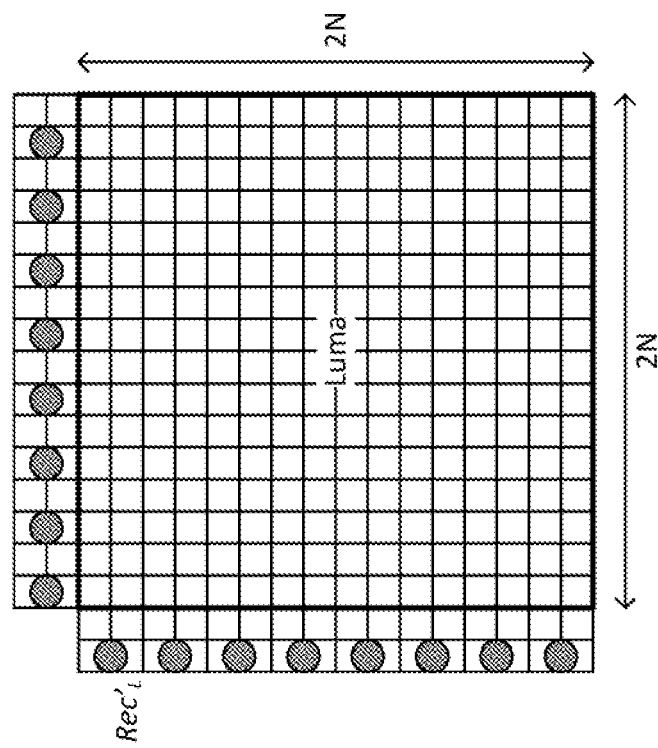
FIG. 8 shows a diagram of neighboring sample locations for parameter calculation for cross component linear model in some examples.
Figure 8:
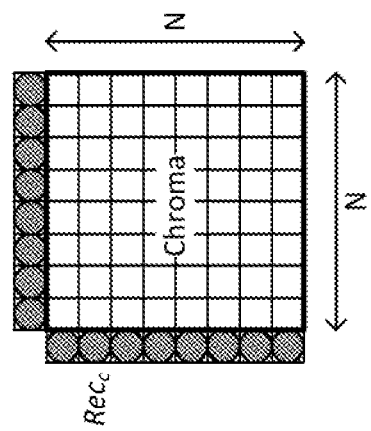

FIG. 8 shows a diagram of neighboring sample locations for parameter calculation for CCLM in some examples. Referring to FIG. 8, neighboring sample pairs (luma samples and chroma samples) to derive parameters for the CCLM prediction are shown in shaded circles. In the FIG. 8 example, the current luma block size is 2N by 2N, and the current chroma block size is N by N. The neighboring samples pair can include 2N reference sample pair, such as 2N reference samples adjacent to the current chroma block and 2N reference samples adjacent to the current luma block. According to an aspect of the disclosure, the neighboring sample locations in FIG. 8 can be used when LM mode (also referred to as LM_LT or LM_LA) is applied.

In some examples, in LM_T (also referred to as LM_A) mode, the above template is used to calculate the parameters of the linear model. To get more samples, the above template is extended to (W'=W+H) samples. In some examples, in LM_L mode, left template is used to calculate the parameters of the linear model. To get more samples, the left template is extended to (H'=H+W) samples.

In some examples, in LM_LT mode, left and above templates are used to calculate the parameters of the linear model. In an example, to match the chroma sample locations for 4:2:0 video sequences, two types of down-sampling filter are applied to luma samples to achieve 2 to 1 down-sampling ratio in both horizontal and vertical directions. The selection of down-sampling filter can be specified by a SPS level flag.

In some examples (e.g., VVC), CCLM is extended by using the second technique multi-model LM (MMLM). In the MMLM mode, a threshold is calculated as an average of the luma reconstructed neighboring samples. Then, the reconstructed neighboring samples are classified into two classes using the threshold, such as a first class of reconstructed neighboring samples that are larger than the threshold, and a second class of reconstructed neighboring samples that are smaller than the threshold. The linear model of each class is respectively derived using the least-mean-square (LMS) method in an example. In some examples, a slope adjustment can be applied to CCLM and MMLM. The slope adjustment can tilt the linear function which maps luma values to chroma values with respect to a center point determined by the average luma value of the reference samples in the neighboring samples.

In some examples, the third technique that is referred to as convolutional cross-component model (CCCM) can be used to predict chroma samples from reconstructed luma samples, such as in a similar spirit as the CCLM modes in ECM-6.0. In the CCCM, similar to CCLM, the reconstructed luma samples are down-sampled to match the lower resolution chroma grid when chroma sub-sampling is used. Also, similarly to CCLM, there is an option of using a single model or multi-model variant of CCCM. In an example, the multi-model variant uses two models, one model derived for samples above the average luma reference value and another model for the rest of the samples (following the spirit of the CCLM design). In some examples, the multi-model CCCM mode can be selected for PUs which have at least 128 reference samples available.

In the CCCM, convolutional filter is used. In some examples, the convolution filter is a 7-tap convolution filter. The convolutional 7-tap filter can include a first term of 5-tap plus sign shape spatial component (also referred to as spatial 5-tap component, the spatial 5-tap component can have a cross shape, also referred to as plus sign shape), a second term of a nonlinear term P and a third term of a bias term.

Figure 9:
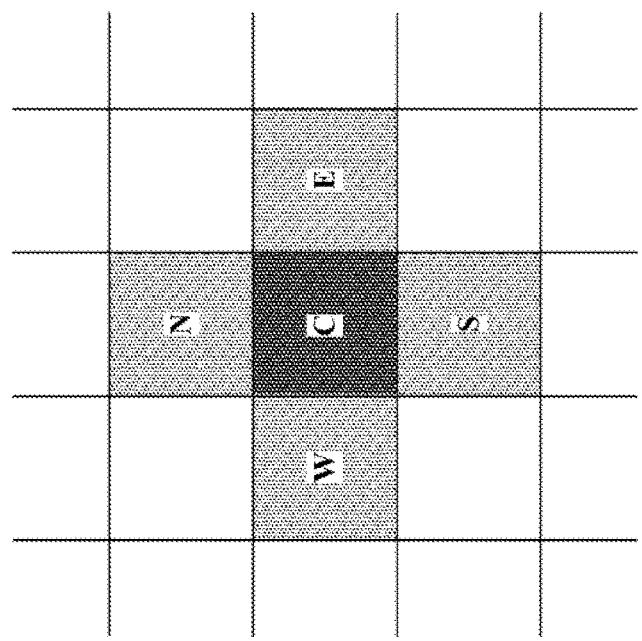
FIG. 9 shows locations of luma sample locations that are inputs to a spatial 5-tap component in an example.

FIG. 9 shows locations of luma sample locations that are inputs to the spatial 5-tap component in an example. The inputs to the spatial 5-tap component of the convolutional 7-tap filter includes a center (C) luma sample which is collocated with the chroma sample to be predicted and above/north (N), below/south (S), left/west (W) and right/east (E) neighbors.

In some examples, the nonlinear term P is represented as power of two of the center luma sample C and scaled to the sample value range of the content, such as according to Eq. (4)

$$P=(C\times C+\text{midVal})>>\text{bitDepth} \qquad \text{Eq. (4)}$$

In an example, for 10-bit content, the nonlinear term P is calculated according to Eq. (5)

$$P=(C\times C+512)>>10 \qquad \text{Eq. (5)}$$

In some examples, the bias term B represents a scalar offset between the input and output (similarly to the offset term in CCLM) and is set to middle chroma value (512 for 10-bit content) in an example.

In some examples, the output of the convolutional 7-tap filter is calculated as a convolution between the filter coefficients $c_i$ and the input values and clipped to the range of valid chroma samples, such as according to Eq. (6)

$$\text{predChromaVal}=c_0C+c_1N+c_2S+c_3E+c_4W+c_5P+c_6B \qquad \text{Eq. (6)}$$

In some examples, the filter coefficients $c_i$ can be determined (calculated) by minimizing mean squared error (MSE) between predicted and reconstructed chroma samples in a reference area.

Figure 10:
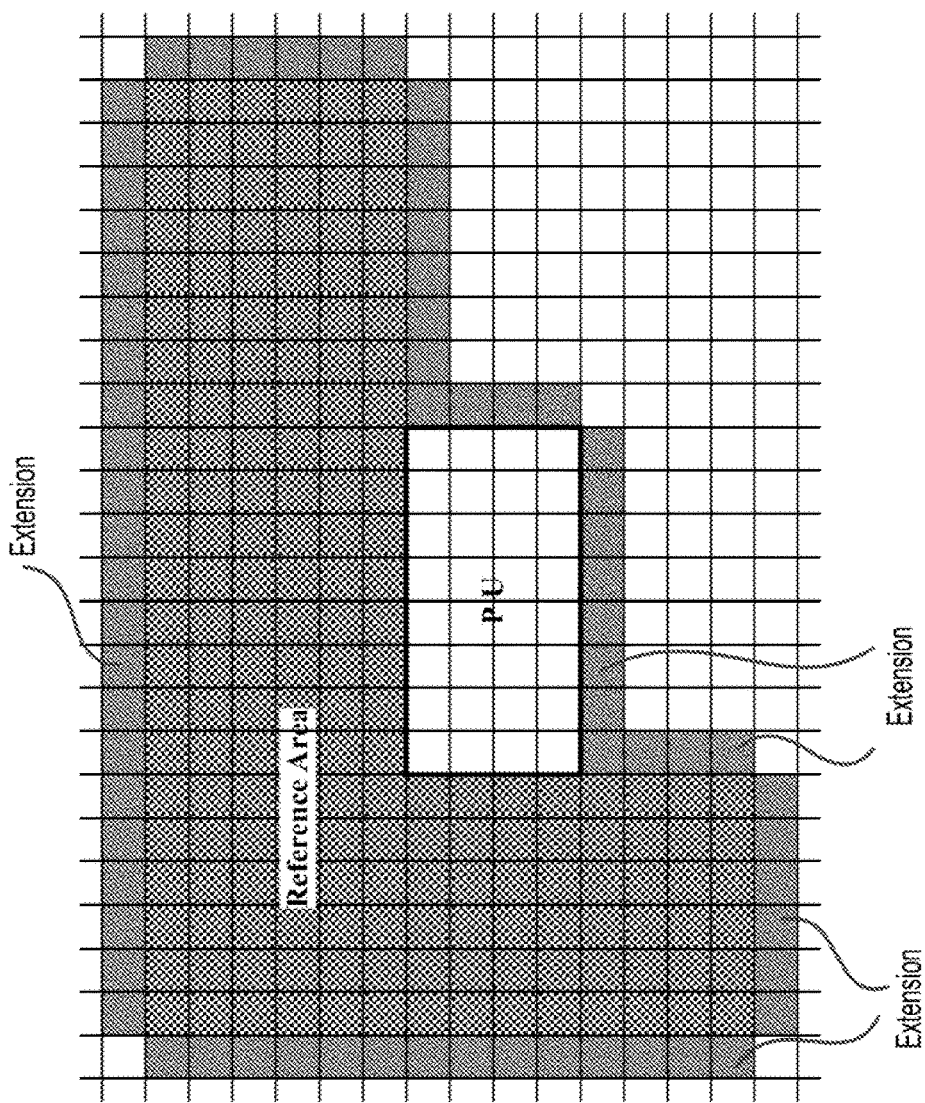
FIG. 10 shows a diagram illustrating a reference area that includes 6 lines of chroma samples above and left of a prediction unit.

FIG. 10 shows a diagram illustrating a reference area that includes 6 lines of chroma samples above and left of a PU. The reference area extends one PU width to the right and one PU height below the PU boundaries. In some examples, the reference area is adjusted to include only available samples. In some examples, the extensions to the reference area are used to support the "side samples" of the plus shaped spatial filter and are padded when in unavailable areas.

In some examples, the MSE minimization is performed by calculating autocorrelation matrix for the luma input and a cross-correlation vector between the luma input and chroma output. Autocorrelation matrix is LDL decomposed and the final filter coefficients are calculated using back-substitution. In an example, the MSE minimization process for the filter coefficients is roughly similar to the calculation of the ALF filter coefficients in ECM, however LDL decomposition is used in the MSE minimization process for the filter coefficients instead of Cholesky decomposition to avoid using square root operations.

In some examples, the fourth technique gradient linear model (GLM) is used. Compared with the CCLM, instead of down-sampled luma values, the GLM utilizes luma sample gradients to derive the linear model. Specifically, when the GLM is applied, the input to the CCLM process, i.e., the down-sampled luma samples L, are replaced by luma sample gradients G. The other parts of the CCLM (e.g., parameter derivation, prediction sample linear transform) are kept unchanged. In an example, a predicted C is calculated according to Eq. (7)

$$C = a \cdot G + b \qquad \text{Eq. (7)}$$

In some examples, for signaling, when the CCLM mode is enabled to the current CU, two flags are signaled separately for Cb and Cr components to indicate whether GLM is enabled to each component. In some examples, when the GLM is enabled for one component, one syntax element is further signaled to select one of 4 gradient filters for the gradient calculation.

Figure 11:
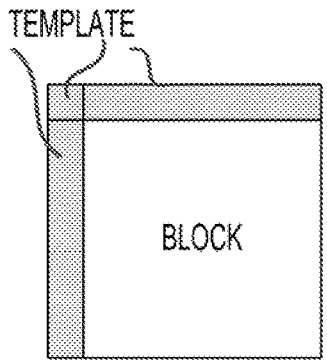
FIG. 11 shows four Sobel based gradient filter patterns in some examples.

FIG. 11 shows an example of four Sobel based gradient filter patterns that can be used for GLM.

Some aspects of the disclosure provide techniques of adjustments for LIC, thus LIC can be flexibly adjusted for various scenarios, and thus can improve the accuracy of the illuminance compensation when the LIC is enabled.

It is noted that various aspects of the LIC can be modified with adjustment. In some examples, samples can be classified into different classes, different classes can have different derived models, and thus multiple models can be used for LIC (referred to as multi-model LIC). In a scenario, a block may include objects that experience different illumination changes, and the multi-model LIC can more accurately compensate for the illumination changes of the objects. In some examples, configurations of template can be adjusted, such as location, size, and the like of the template can be adjusted. In a scenario, a portion of the neighboring samples of a block may experience similar illumination changes and other portions may have different illumination changes, thus with the adjustment to the template can more accurately compensate for the illumination changes. In some examples, different equations can be used to model the LIC to improve accuracy of the illuminance compensation.

According to an aspect of the disclosure, multiple models can be used for LIC (referred to as multi-model LIC). In some examples, samples can be classified into different classes, and different classes can use different models that are derived from the different classes of the template samples.

In some examples, for LIC, one of the current block (in the current picture) and the reference block (in the reference picture) is referred to as a first block, and the other of the current block and the reference block is referred to as a second block. For example, when the current block is referred to as the first block, and the reference block is referred to as the second block; similarly when the reference block is referred to as the first block, and the current block is referred to as the second block. In some examples, the classification can be determined based on samples associated with the reference block, such as samples of reference block and the reference block template; then samples associated with the current block, such as the samples of the current block and the current block template can have the same classes as the collocated samples associated with the reference block. Similarly, in some examples, the classification can be determined based on samples associated with the current block, such as samples of current block and the current block template; then samples associated with the reference block, such as the samples of the reference block and the reference block template can have the same classes as the collocated samples associated with the current block.

While some description performs classification based on samples associated with reference block, the description can be modified to perform classification based on samples associated with the current block.

In some examples, samples associated with the reference block, such as samples of the reference block and samples of the reference block template, are classified into multiple classes based on certain classification criterion. Then, samples associated with the current block, such as samples of the current block and the samples of the current block template, are classified based on the class index of collocated reference samples. For each class, a model is derived using the samples of the current block template and the samples of the reference block template with the same class index. Then, the prediction samples of each class are derived using the model and collocated reference samples (samples of the reference block) of the same class.

In some examples, an average sample value of the reference block (and/or reference block template) is calculated, and the classification criterion can classify samples into two classes based on the average sample value. For example, a sample is compared with the average sample value, when the sample is less than (or less than and equal to) the average sample value, the sample is classified as a first class, otherwise, the sample is classified as a second class. Then respective models can be derived for the multiple classes. It is noted that the multi-model LIC based on the average sample value can be referred to as amplitude-based multi-model LIC.

In some examples, the model derivation for each class can be implemented using least-mean-square (LMS) that is similarly used in CCLM/MM-CCLM. In some examples, the model derivation for each class can be implemented using autocorrelation matrix with LDL decomposition in filter coefficients calculation for convolutional filter of CCCM.

In some examples, the multi-model LIC (e.g., the amplitude-based multi-model LIC, and the like) can replace the LIC with single model without any syntax change. In an example, a flag is signaled at high level syntax, such as SPS, PPS, picture header, slice header to indicate whether the multi-model in is used or not.

In some examples, when LIC is applied (e.g., indicated by a first flag), a second flag is signaled to indicate whether multi-model LIC (e.g., the amplitude-based multi-model LIC, and the like) or a single model LIC is selected.

It is noted that various classification criterion can be used. In some examples, samples can be classified according to gradient of the samples. In some examples, a gradient of a sample can be calculated as a difference of the sample value and a neighboring sample value. For example, a gradient of a sample is calculated as a difference of the sample value and a right neighboring sample value. In some other examples, a gradient of a sample is calculated based on a gradient filter pattern, such as one of the four Sobel based gradient filter patterns in FIG. 11.

In some examples, with the gradient value of each sample is calculated, and the cumulative gradient in the reference block (and/or reference block template) can be statically calculated. For example, a histogram of gradient values in the reference block can be determined, and classification threshold(s) can be determined based on the histogram. For example, a medium value of the gradient values can be determined based on the histogram. To classify a sample, the gradient value of the sample is compared with the medium value. When the gradient value of the sample is less than (or less than and equal to) the medium value, the sample is classified into a first class, otherwise, the sample is classified into a second class. It is noted that the multi-model LIC based on the gradient of the samples can be referred to as gradient-based multi-model LIC.

In some examples, an average of the gradient values (or the medium value) is used as the classification threshold. However, when the average of the gradient values (or the medium value) is lower than a predefined threshold value, the gradient-based multi-model LIC is inferred as disabled.

It is noted that similar signaling techniques for the amplitude-based multi-model LIC can be used for gradient-based multi-model LIC.

Further, in some examples, the gradient-based multi-model LIC can be combined with the amplitude-based multi-model, and can be referred to as combined amplitude and gradient based multi-model LIC. For example, by using the combination of the gradient-based multi-model and the amplitude-based multi-model in the above example, four different models are used for coding a block. The model selection of each sample is determined based on the classification of the amplitude of the sample value and gradient value of the sample.

It is note that the combined amplitude and gradient based multi-model LIC can use similar syntax signaling techniques as the amplitude-based multi-model LIC.

In some embodiments, a syntax is signaled to indicate which multi-model LIC, such as amplitude-based multi-model LIC, gradient-based multi-model LIC, combined amplitude and gradient based multi-model LIC, and the like, is selected for LIC. It is proposed to allow LIC to use different template size and/or template locations. In one embodiment, the above template, left template, and both of left and above template could be selected for LIC. In one embodiment, M rows could be used for above template and/or N columns could be used for left template. Both of M and N are nonzero positive integer value. In one embodiment, a syntax is signaled to indicate which template is selected for LIC. In one embodiment, the template selection is implicitly derived based on coded information, including but not limited to block size, block shape, block aspect ratio, neighboring reconstruction samples.

According to an aspect of the disclosure, different template sizes and/or template locations can be used in LIC, for example, to derive parameters of an LIC model. For example, an above template, a left template, and both the left template and the above template could be selected for LIC. For ease of description, when a template comprises a subset of reconstructed neighboring samples that are above and left to the current block, the template can be referred to as a subset template in some examples.

Figure 12A:
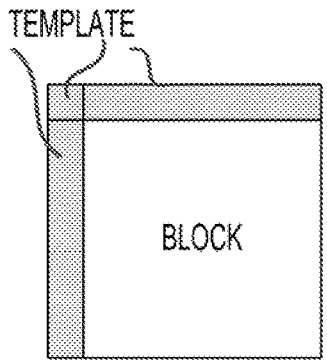
FIGS. 12A-12F show some examples of template patterns for a block.
Figure 12B:
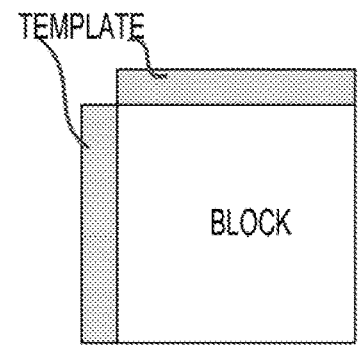
Figure 12C:
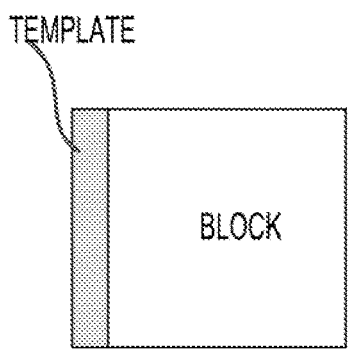
Figure 12D:
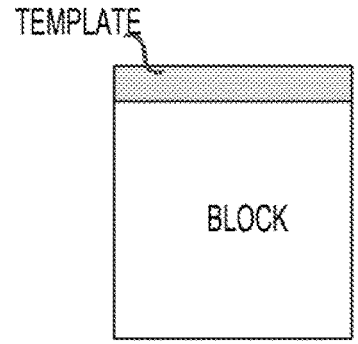
Figure 12E:
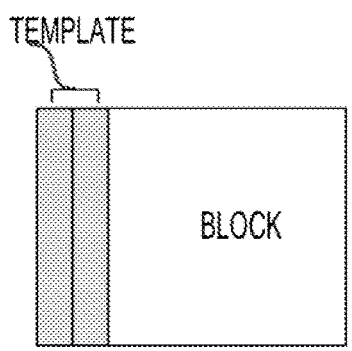
Figure 12F:
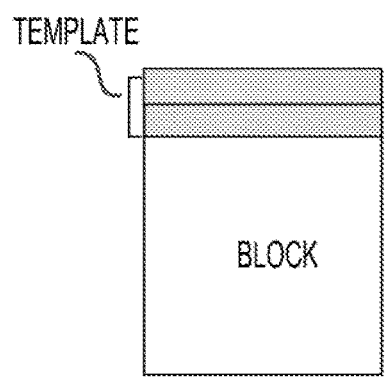

FIGS. 12A-12F show some examples of templates and/or subset templates for a block. In FIG. 12A, the template of the block includes an above row, a left column and an above left location with regard to the block. In FIG. 12B, the template (subset template) of the block includes an above row and a left column with regard to the block. In FIG. 12C, the template (subset template) of the block includes an immediate left column of the block. In FIG. 12D, the template (subset template) of the block includes an immediate above row of the block. In FIG. 12E, the template (subset template) of the block includes multiple left columns of the block. In FIG. 12F, the template (subset template) of the block includes multiple above rows of the block.

In some examples, the template of the block for LIC can be selected from various template candidates, such as the examples in FIGS. 12A-12F.

In some examples, M rows can be used for above template and/or N columns can be used for left template. Both of M and N are nonzero positive integer value.

In some examples, a syntax is signaled to indicate which of the template candidates is selected as the template for LIC.

In some examples, the template selection is implicitly derived based on coded information, including but not limited to block size, block shape, block aspect ratio, neighboring reconstruction samples, and the like.

According to an aspect of the disclosure, different equations can be used to model the LIC. The equations for modeling the LIC can be different from the one used in CCLM.

In some examples, a non-linear term, such as $(p[x, y])^2$, can be used in an equation to model LIC, such as according to Eq. (8):

$$predC = \alpha_0 \times p[x,y] + \alpha_1 \times p[x,y]^2 + \beta \qquad \text{Eq. (8)}$$

where p[x, y] is a reference sample pointed to by MV at a location [x, y] on reference block, and parameters $\alpha_0$, $\alpha_1$, and $\beta$ are the model parameters. In an example, the autocorrelation matrix with LDL decomposition is used to obtain the parameters $\alpha_0$, $\alpha_1$, and $\beta$.

In some examples, an n-tap spatial domain filter (also referred to as n-tap filter, spatial domain filter, and the like) is applied on reference samples to form the equation, such as according to Eq. (9):

$$predC = \sum_{k=0}^{n-1} \alpha_k \times p[x_k, y_k] + \beta \qquad \text{Eq. (9)}$$

where $p[x_k, y_k]$ is a reference sample pointed to by MV at a location $[x_k, y_k]$ on reference block. The parameters $\alpha_0$, $\alpha_1$, ... $\alpha_{n-1}$ and $\beta$ are the model parameters.

Figures 13A, 13B, 13C:
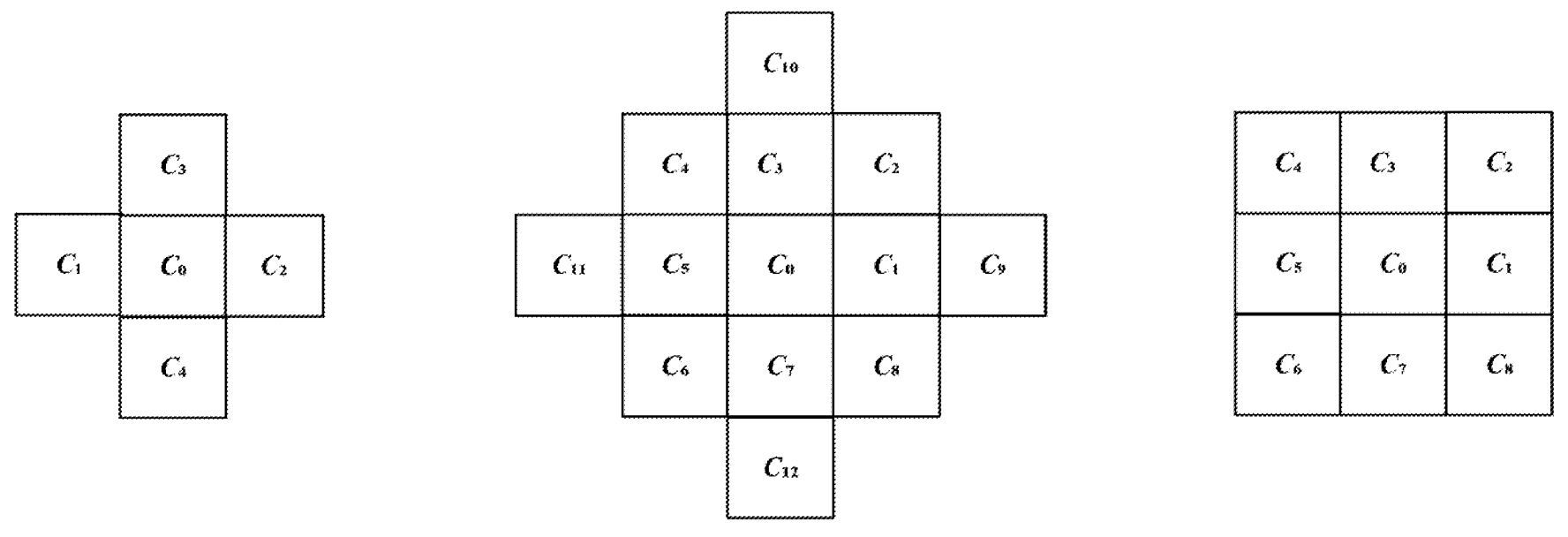

FIGS. 13A-13C show examples of filter shapes for LIC in some embodiments. It is noted that the n-tap filter shape could be but not limited to a cross shape as shown by FIG. 13A, a diamond shape as shown by FIG. 13B, a square shape as shown by FIG. 13C.

In some examples, a syntax is signaled to indicate which n-tap filter shape is selected when the n-tap filter is used.

In some examples, the spatial domain filter is a symmetric filter with n/2 filter coefficients if n is an even number or (n+1)/2 filter coefficients if n is an odd number.

In some examples, a non-linear term could also be added in with the spatial domain filter, such as according to Eq. (10):

$$predC = \sum_{k=0}^{n-1} \alpha_k \times p[x_k, y_k] + \alpha_n \times p[x, y]^2 + \beta \qquad \text{Eq. (10)}$$

In some examples, more than one non-linear terms can be used. It is noted that the number of non-linear terms is smaller than or equal to the spatial filter tap number n in some examples.

In some examples, the autocorrelation matrix with LDL decomposition is used to obtain the parameters $\alpha_k$ (k∈[0, n−1]) and $\beta$.

In some examples, an n-tap spatial domain filter is applied to reference samples to perform LIC, such as according to Eq. (11):

$$predC = \sum_{k=0}^{n-1} \alpha_k \times p[x_k, y_k] \qquad \text{Eq. (11)}$$

where p[$x_k$, $y_k$] is a reference sample pointed to by MV at a location [$x_k$, $y_k$] on reference block. Further, the autocorrelation matrix with LDL decomposition is used to obtain the parameters $\alpha_k$, and k∈[0, n−1].

In some embodiments, the gradient value of reference sample could be used as input to perform LIC, such as according to Eq. (12)

$$predC = \alpha \times G[x,y] + \beta \qquad \text{Eq. (12)}$$

where G[x, y] is a gradient of the reference sample pointed to by MV at a location [x, y] on reference block. In an example, the autocorrelation matrix with LDL decomposition is used to obtain the parameters $\alpha$ and $\beta$.

In some examples, the gradient term of reference sample which is mentioned Eq. (12) can be added into other equations, such as Eq. (8), Eq. (9), Eq. (10) and Eq. (11).

In some examples, pixel down-sampling in current block template and reference block template can be used for model derivation.

In some examples, a syntax is signaled to indicate which model, such as Eq. (8), Eq. (9), Eq. (10), Eq. (11) is used for the coded block.

According to an aspect of the disclosure, different LIC adjustment techniques can be combined. For example, the multi-model derivation technique and the different equations for modeling technique can be combined for performing LIC.

In some examples, each class may have its own model derivation method or equation, such as one of Eq. (8)-Eq. (12) and the associated model derivation method. In some examples, the model derivation method is always used for that class.

In some examples, a syntax is signaled for each class to indicate which model derivation method or equation is used. The model derivation methods or equations include, but not limited Eq. (8) to Eq. (12) and the associated model derivation method.

In some examples, all possible combinations or a subset of all possible combinations can be predefined in a list and an index is signaled to indicate which combination in the list is used for performing LIC to code the block.

Figure 14:
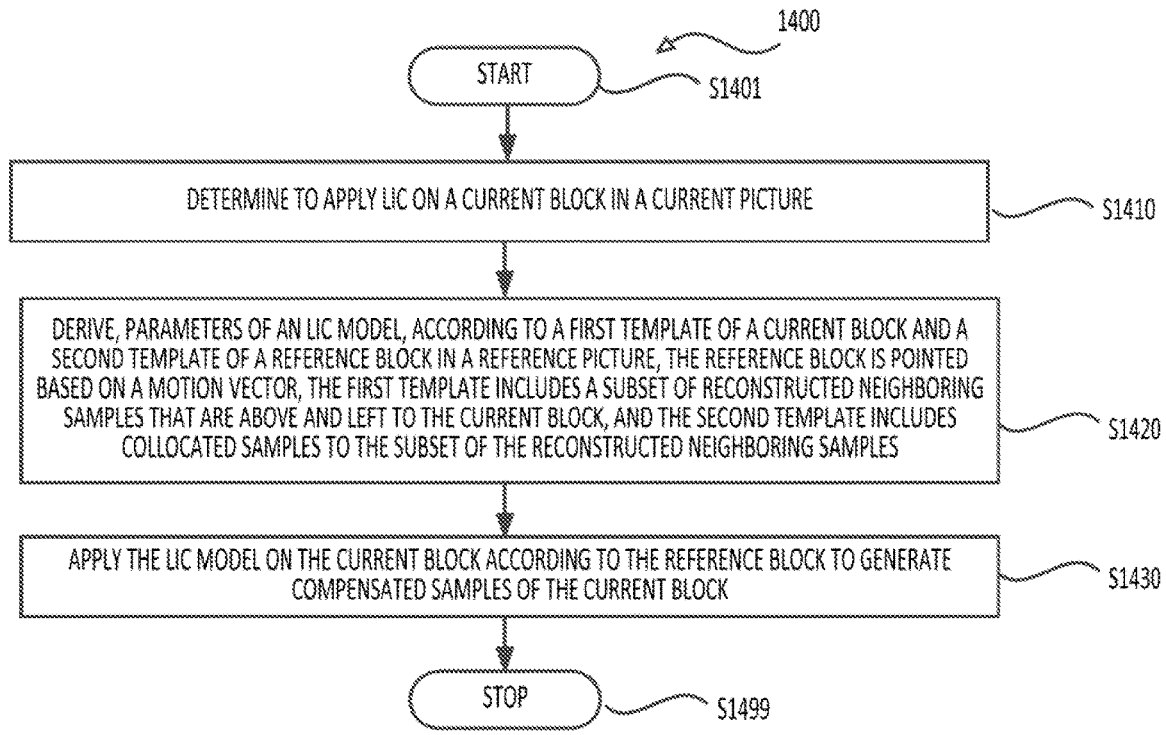
FIG. 14 shows a flow chart outlining a process according to some embodiment of the disclosure.

FIG. 14 shows a flow chart outlining a process (1400) according to an embodiment of the disclosure. The process (1400) can be used in a video encoder. In various embodiments, the process (1400) is executed by processing circuitry, such as the processing circuitry that performs functions of the video encoder (103), the processing circuitry that performs functions of the video encoder (303), and the like. In some embodiments, the process (1400) is implemented in software instructions, thus when the processing circuitry executes the software instructions, the processing circuitry performs the process (1400). The process starts at (S1401) and proceeds to (S1410).

At (S1410), applying local illumination compensation (LIC) to a current block in a current picture is determined.

At (S1420), parameters of an LIC model are derived according to a first template (or first subset template) of a current block and a second template (or second subset template) of a reference block in a reference picture. The position of the reference block is determined based on a motion vector of the current block. The first template includes a subset of reconstructed neighboring samples that are above and left to the current block, and the second template includes collocated samples to the subset of the reconstructed neighboring samples.

It is noted that, in some embodiments of the present disclosure, LIC is allowed to use different template sizes and/or template locations. In an example, a template such as the first template (or first subset template) can have different template sizes and/or template locations. In one embodiment, the above template, left template, and both of left and above template could be selected for LIC. The second template (or the second subset template) corresponds to the first template, for example, including collocated samples to the first template.

At (S1430), the LIC model is applied on the current block according to the reference block to generate compensated samples of the current block.

In one embodiment, M rows could be used for above template and/or N columns could be used for left template. Both of M and N are nonzero positive integer value. In one embodiment, a syntax is signaled to indicate which template is selected for LIC. In one embodiment, the template selection is implicitly derived based on coded information, including but not limited to block size, block shape, block aspect ratio, neighboring reconstruction samples.

In some examples, the first template includes a row of the reconstructed neighboring samples that are immediately adjacent above the current block. In some examples, the first template includes a column of the reconstructed neighboring samples that are immediately adjacent left to the current block.

In some examples, the first template includes one or more rows of the reconstructed neighboring samples that are above the current block. In some examples, the first template includes one or more columns of the reconstructed neighboring samples that are left to the current block.

In some examples, a syntax is encoded in a coded bitstream for at least the current picture, and the syntax indicates the first template for selection from a plurality of template candidates.

In some examples, the first template to derive the parameters of the LIC model is determined according to at least one of a size of the current block, a shape of the current block, an aspect ratio of the current block, or the reconstructed neighboring samples.

Then, the process proceeds to (S1499) and terminates.

The process (1400) can be suitably adapted. Step(s) in the process (1400) can be modified and/or omitted. Additional step(s) can be added. Any suitable order of implementation can be used.

Figure 15:
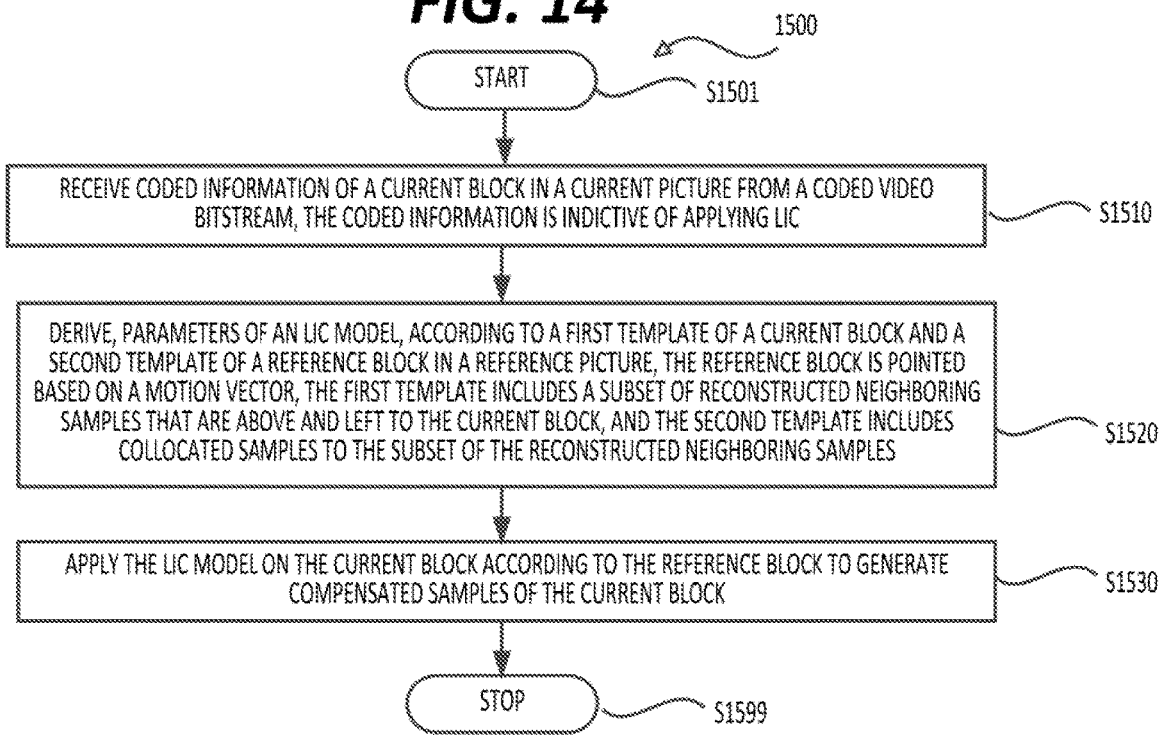
FIG. 15 shows a flow chart outlining another process according to some embodiment of the disclosure.

FIG. 15 shows a flow chart outlining a process (1500) according to an embodiment of the disclosure. The process (1500) can be used in a video decoder. In various embodiments, the process (1500) is executed by processing circuitry, such as the processing circuitry that performs functions of the video decoder (110), the processing circuitry that performs functions of the video decoder (210), and the like. In some embodiments, the process (1500) is implemented in software instructions, thus when the processing circuitry executes the software instructions, the processing circuitry performs the process (1500). The process starts at (S1501) and proceeds to (S1510).

At (S1510), coded information of a current block in a current picture is received from a coded video bitstream, the coded information is indicative of applying local illumination compensation (LIC).

At (S1520), parameters of an LIC model are derived according to a first template (or first subset template) of a current block and a second template (or second subset template) of a reference block in a reference picture. The position of the reference block is determined based on a motion vector. The first template includes a subset of reconstructed neighboring samples that are above and left to the current block, and the second template includes collocated samples to the subset of the reconstructed neighboring samples.

It is noted that, in some embodiments of the present disclosure, LIC is allowed to use different template sizes and/or template locations. In an example, a template such as the first template (or first subset template) can have different template sizes and/or template locations. In one embodiment, the above template, left template, and both of left and above template could be selected for LIC. The second template (or the second subset template) corresponds to the first template, for example, including collocated samples to the first template.

At (S1530), the LIC model is applied on the current block according to the reference block to generate compensated samples of the current block.

In one embodiment, M rows could be used for above template and/or N columns could be used for left template. Both of M and N are nonzero positive integer value. In one embodiment, a syntax is signaled to indicate which template is selected for LIC. In one embodiment, the template selection is implicitly derived based on coded information, including but not limited to block size, block shape, block aspect ratio, neighboring reconstruction samples.

In some examples, the first subset template includes a row of the reconstructed neighboring samples that are immediately adjacent above the current block. In some examples, the first subset template includes a column of the reconstructed neighboring samples that are immediately adjacent left to the current block.

In some examples, the first subset template includes one or more rows of the reconstructed neighboring samples that are above the current block. In some examples, the first subset template includes one or more columns of the reconstructed neighboring samples that are left to the current block.

In some examples, a syntax is decoded, and the syntax indicates the first subset template for selection from a plurality of template candidates.

In some examples, the first subset template to derive the parameters of the LIC model is determined according to at least one of a size of the current block, a shape of the current block, an aspect ratio of the current block, or the reconstructed neighboring samples.

Then, the process proceeds to (S1599) and terminates.

The process (1500) can be suitably adapted. Step(s) in the process (1500) can be modified and/or omitted. Additional step(s) can be added. Any suitable order of implementation can be used.

Figure 16:
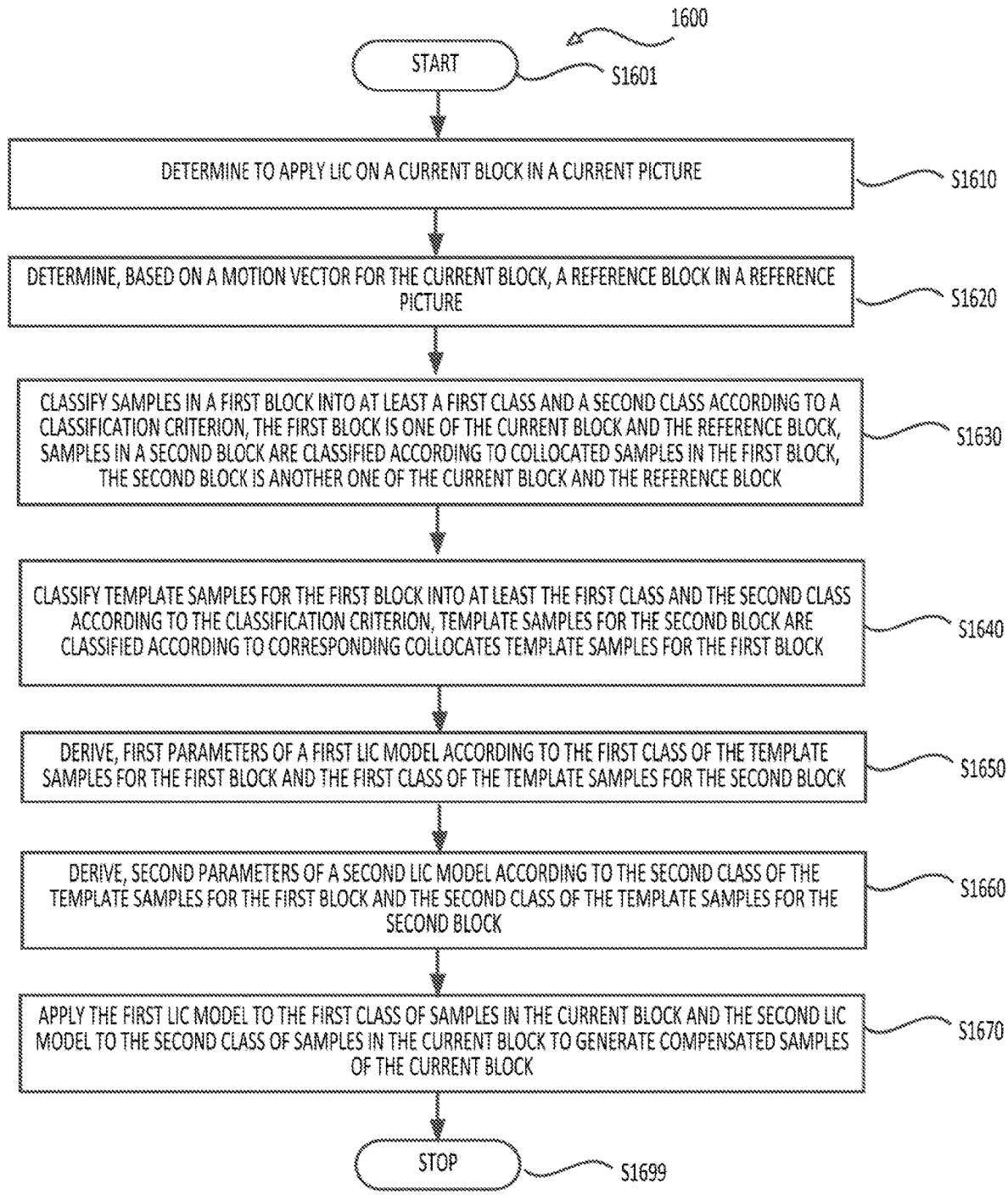
FIG. 16 shows a flow chart outlining a process according to some embodiment of the disclosure.

FIG. 16 shows a flow chart outlining a process (1600) according to an embodiment of the disclosure. The process (1600) can be used in a video encoder. In various embodiments, the process (1600) is executed by processing circuitry, such as the processing circuitry that performs functions of the video encoder (103), the processing circuitry that performs functions of the video encoder (303), and the like. In some embodiments, the process (1600) is implemented in software instructions, thus when the processing circuitry executes the software instructions, the processing circuitry performs the process (1600). The process starts at (S1601) and proceeds to (S1610).

At (S1610), applying local illumination compensation (LIC) to a current block in a current picture is determined.

At (S1620), based on a motion vector for the current block, a reference block in a reference picture is determined.

At (S1630), samples in a first block are classified into at least a first class and a second class according to a classification criterion. The first block is one of the current block and the reference block, samples in a second block are classified according to collocated samples in the first block to have the same classes as the collocated samples in the first block, the second block are another one of the current block and the reference block. In an example, the first block is the current block and the second block is the reference block. In another example, the first block is the reference block and the second block is the current block.

At (S1640), template samples for the first block are classified into at least the first class and the second class according to the classification criterion. Template samples for the second block are classified according to corresponding collocates template samples for the first block to have the same classes as the corresponding collocated template samples for the first block.

At (S1650), first parameters of a first LIC model are derived according to the first class of the template samples for the first block and the first class of the template samples for the second block.

At (S1660), second parameters of a second LIC model are derived according to the second class of the template samples for the first block and the second class of the template samples for the second block.

At (S1670), the first LIC model is applied to the first class of samples in the current block and the second LIC model is applied to the second class of samples in the current block to generate compensated samples of the current block.

It is noted that, in some embodiments of the present disclosure, multiple models for LIC can be used. In one embodiment, samples of the reference block and the reference block template are classified into multiple classes based on certain classification criterion. Then samples of current block and current block template are classified based on the class index of collocated reference samples. For each class, one model is derived using the samples of current block template and reference block template associated with the same class index. Finally, the prediction samples of each class are derived using the model and collocated reference samples associated with the same class. In one embodiment, an average value of the reference block (and/or reference block template) is calculated, and the classification criterion on a sample is comparing the sample with this average value, when the sample value is less than (or less than and equal to) this average value, this sample is classified as a first class, otherwise, this sample is classified as a second class. In one embodiment, the model derivation for each class could be implemented by using the Least-Mean-Square (LMS) method in CCLM/MM-CCLM or autocorrection matrix with LDL decomposition. In one embodiment, the multi-model LIC can replace the LIC with single model without any syntax change. In one example, a flag is signaled at high level syntax such as SPS, PPS, picture header, slice header to indicate whether the multi-model LIC is used or not. In another embodiment, when LIC is applied, another flag is signaled to indicate the multi-model LIC in or a single model LIC is selected. In one embodiment, the gradient value of each sample is calculated, and the cumulative gradient value is calculated in the reference block (and/or reference block template). The average value of the cumulative gradient is calculated, and the classification criterion on a sample is comparing the sample with this average value, if the sample value is less than (or less than and equal to) this average value, this sample is classified as a first class, otherwise, this sample is classified as a second class. In one embodiment, when the average gradient value is lower than a predefined threshold value, the gradient-based multi-model is inferred as disabling. In one embodiment, syntax signaling can be used for the gradient-based multi-model LIC. In one embodiment, the gradient-based multi-model can be combined with the amplitude-based multi-model. By using the combination of these two multi-models, four different models are used for the coded block. The model selection of each sample can be based on the classification of its amplitude and gradient value.

In some examples, the first LIC model and the second LIC model have at least one different parameter value.

In some examples, to classify the samples in the first block into at least the first class and the second class according to the classification criterion, an amplitude threshold is determined based on an average of sample values in the first block. A sample is classified into the first class or the second class based on a comparison of the sample with the amplitude threshold.

In some examples, to classify the samples in the first block into at least the first class and the second class according to the classification criterion, a gradient threshold is determined based on gradient values of the samples in the first block. A sample is classified into the first class or the second class based on a comparison of a gradient value of the sample with the gradient threshold.

In some examples, to derive the first parameters of the first LIC model, at least one of a least-mean-square operation and an autocorrelation matrix with LDL decomposition operation can be performed to derive the first parameters.

In some examples, a syntax is encoded into a coded bitstream carrying at least the current picture and the syntax is indicative of applying more than one LIC model to generate the compensated samples of the current block.

Then, the process proceeds to (S1699) and terminates.

The process (1600) can be suitably adapted. Step(s) in the process (1600) can be modified and/or omitted. Additional step(s) can be added. Any suitable order of implementation can be used.

Figure 17:
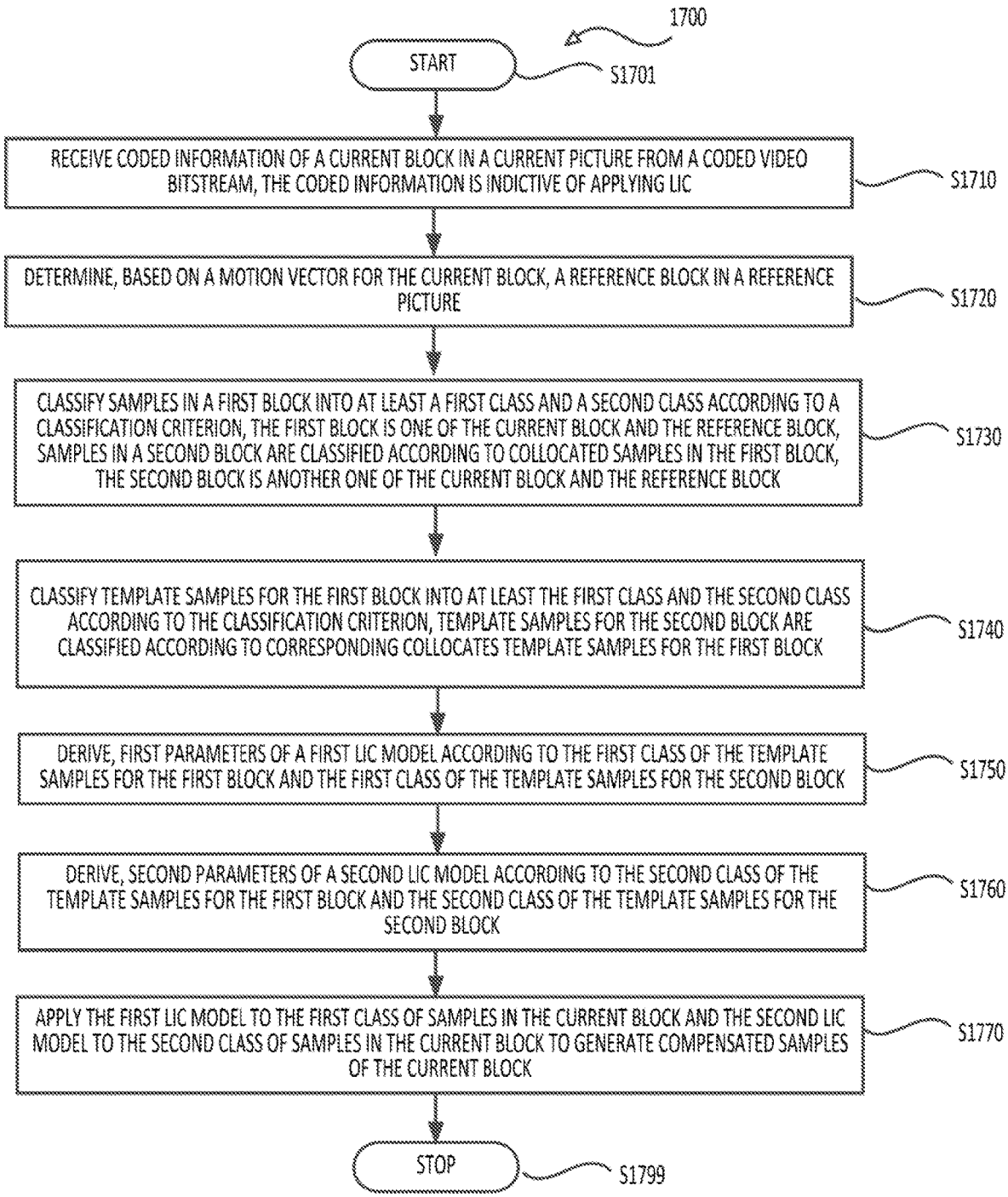
FIG. 17 shows a flow chart outlining another process according to some embodiment of the disclosure.

FIG. 17 shows a flow chart outlining a process (1700) according to an embodiment of the disclosure. The process (1700) can be used in a video decoder. In various embodiments, the process (1700) is executed by processing circuitry, such as the processing circuitry that performs functions of the video decoder (110), the processing circuitry that performs functions of the video decoder (210), and the like. In some embodiments, the process (1700) is implemented in software instructions, thus when the processing circuitry executes the software instructions, the processing circuitry performs the process (1700). The process starts at (S1701) and proceeds to (S1710).

At (S1710), coded information of a current block in a current picture is received from a coded video bitstream, the coded information is indicative of applying local illumination compensation (LIC).

At (S1720), based on a motion vector for the current block, a reference block in a reference picture is determined.

At (S1730), samples in a first block are classified into at least a first class and a second class according to a classification criterion. The first block is one of the current block and the reference block, samples in a second block are classified according to collocated samples in the first block to have the same classes as the collocated samples in the first block, the second block are another one of the current block and the reference block. In an example, the first block is the current block and the second block is the reference block. In another example, the first block is the reference block and the second block is the current block.

At (S1740), template samples for the first block are classified into at least the first class and the second class according to the classification criterion. Template samples for the second block are classified according to corresponding collocates template samples for the first block to have the same classes as the corresponding collocated template samples for the first block.

At (S1750), first parameters of a first LIC model are derived according to the first class of the template samples for the first block and the first class of the template samples for the second block.

At (S1760), second parameters of a second LIC model are derived according to the second class of the template samples for the first block and the second class of the template samples for the second block.

At (S1770), the first LIC model is applied to the first class of samples in the current block and the second LIC model is applied to the second class of samples in the current block to generate compensated samples of the current block.

It is noted that, in some embodiments of the present disclosure, multiple models for LIC can be used. In one embodiment, samples of the reference block and the reference block template are classified into multiple classes based on certain classification criterion. Then samples of current block and current block template are classified based on the class index of collocated reference samples. For each class, one model is derived using the samples of current block template and reference block template associated with the same class index. Finally, the prediction samples of each class are derived using the model and collocated reference samples associated with the same class. In one embodiment, an average value of the reference block (and/or reference block template) is calculated, and the classification criterion on a sample is comparing the sample with this average value, when the sample value is less than (or less than and equal to) this average value, this sample is classified as a first class, otherwise, this sample is classified as a second class. In one embodiment, the model derivation for each class could be implemented by using the Least-Mean-Square (LMS) method in CCLM/MM-CCLM or autocorrection matrix with LDL decomposition. In one embodiment, the multi-model LIC can replace the LIC with single model without any syntax change. In one example, a flag is signaled at high level syntax such as SPS, PPS, picture header, slice header to indicate whether the multi-model LIC is used or not. In another embodiment, when LIC is applied, another flag is signaled to indicate the multi-model LIC in or a single model LIC is selected. In one embodiment, the gradient value of each sample is calculated, and the cumulative gradient value is calculated in the reference block (and/or reference block template). The average value of the cumulative gradient is calculated, and the classification criterion on a sample is comparing the sample with this average value, if the sample value is less than (or less than and equal to) this average value, this sample is classified as a first class, otherwise, this sample is classified as a second class. In one embodiment, when the average gradient value is lower than a predefined threshold value, the gradient-based multi-model is inferred as disabling. In one embodiment, syntax signaling can be used for the gradient-based multi-model LIC. In one embodiment, the gradient-based multi-model can be combined with the amplitude-based multi-model. By using the combination of these two multi-models, four different models are used for the coded block. The model selection of each sample can be based on the classification of its amplitude and gradient value.

In some examples, the first LIC model and the second LIC model have at least one different parameter value.

In some examples, to classify the samples in the first block into at least the first class and the second class according to the classification criterion, an amplitude threshold is determined based on an average of sample values in the first block. A sample is classified into the first class or the second class based on a comparison of the sample with the amplitude threshold.

In some examples, to classify the samples in the first block into at least the first class and the second class according to the classification criterion, a gradient threshold is determined based on gradient values of the samples in the first block. A sample is classified into the first class or the second class based on a comparison of a gradient value of the sample with the gradient threshold.

In some examples, to derive the first parameters of the first LIC model, at least one of a least-mean-square operation and an autocorrelation matrix with LDL decomposition operation can be performed to derive the first parameters.

In some examples, a syntax is decoded and the syntax is indicative of applying more than one LIC model to generate the compensated samples of the current block.

Then, the process proceeds to (S1799) and terminates.

The process (1700) can be suitably adapted. Step(s) in the process (1700) can be modified and/or omitted. Additional step(s) can be added. Any suitable order of implementation can be used.

Figure 18:
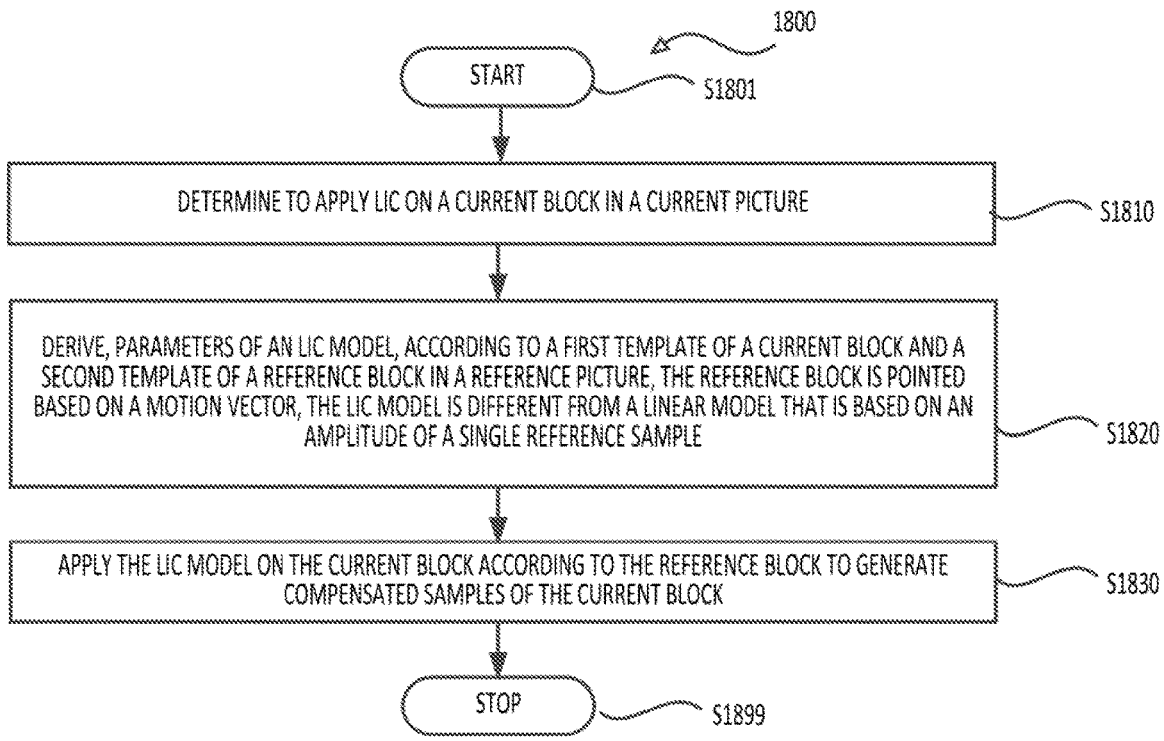
FIG. 18 shows a flow chart outlining a process according to some embodiment of the disclosure.

FIG. 18 shows a flow chart outlining a process (1800) according to an embodiment of the disclosure. The process (1800) can be used in a video encoder. In various embodiments, the process (1800) is executed by processing circuitry, such as the processing circuitry that performs functions of the video encoder (103), the processing circuitry that performs functions of the video encoder (303), and the like. In some embodiments, the process (1800) is implemented in software instructions, thus when the processing circuitry executes the software instructions, the processing circuitry performs the process (1800). The process starts at (S1801) and proceeds to (S1810).

At (S1810), applying local illumination compensation (LIC) on a current block in a current picture is determined.

At (S1820), parameters of an LIC model are derived according to a first template of a current block and a second template of a reference block in a reference picture. The reference block is determined based on a motion vector for the current block. The LIC model is different from a linear model that is based on an amplitude of a single reference sample.

At (S1830), the LIC model is applied on the current block according to the reference block to generate compensated samples of the current block.

It is noted that, in some embodiments, different equations can be used to model the LIC, the equations are different from the one used in CCLM. In one embodiment, a non-linear term can be used to form the equation, such as Eq. (8). In one example, the autocorrelation matrix with LDL decomposition is used to obtain the parameters $\alpha_0$, $\alpha_1$, and $\beta$. In one embodiment, an n-tap spatial domain filter is applied on reference samples to form the equation, such as Eq. (9). In one embodiment, the n-tap filter shape could be but not limited to the diamond shape, cross shape, square shape, . . . , and the like, such as shown in FIGS. 13A-13C. In one embodiment, a syntax is signaled to indicate which n-tap filter shape is selected when the n-tap filter is used. In one embodiment, the spatial domain filter could be a symmetric filter with n/2 filter coefficients if n is an even number or (n+1)/2 filter coefficients if n is an odd number. In one embodiment, the non-linear term could also be added, such as Eq. (10). In another embodiment, more than one non-linear terms could be used and the number of non-linear terms should be smaller than or equal to the spatial filter tap number n. In another embodiment, the autocorrection matrix with LDL decomposition is used to obtain the parameters $\alpha_k$, and $\beta$. In another embodiment, an n-tap spatial domain filter is applied to reference samples to form the equation, such as Eq. (11). The autocorrection matrix with LDL decomposition is used to obtain the parameters $\alpha_k$, and k∈[0, n−1]. In one embodiment, the gradient value of reference sample could be used as input to form the equation, such as Eq. (12). The autocorrection matrix with LDL decomposition is used to obtain the parameters $\alpha$ and $\beta$. In one embodiment, the gradient value of reference sample can be added into the Eqs. (8)-(11). In one embodiment, pixel down-sampling in current block template and reference block template could be used for model derivation. In one embodiment, a syntax is signaled to indicate which modeling method is used for the coded block.

In some examples, the LIC model includes a non-linear term.

In some examples, the LIC model includes an n-tap spatial domain filter, and n is greater than 1. The n-tap spatial domain filter has a filter shape of at least one of a cross shape, a diamond shape, and a square shape.

To derive the parameters of the LIC model, in some examples, a mean square error minimization is performed according to the first template of the current block and the second template of the reference block to calculate filter coefficients of the n-tap spatial domain filter.

In some examples, the LIC model includes a gradient term that is linearly based on a gradient of a reference sample.

In some examples, a syntax is encoded into a coded bitstream carrying at least the current picture, and the syntax is indicative of the LIC model from a plurality of candidates.

Then, the process proceeds to (S1899) and terminates.

The process (1800) can be suitably adapted. Step(s) in the process (1800) can be modified and/or omitted. Additional step(s) can be added. Any suitable order of implementation can be used.

Figure 19:
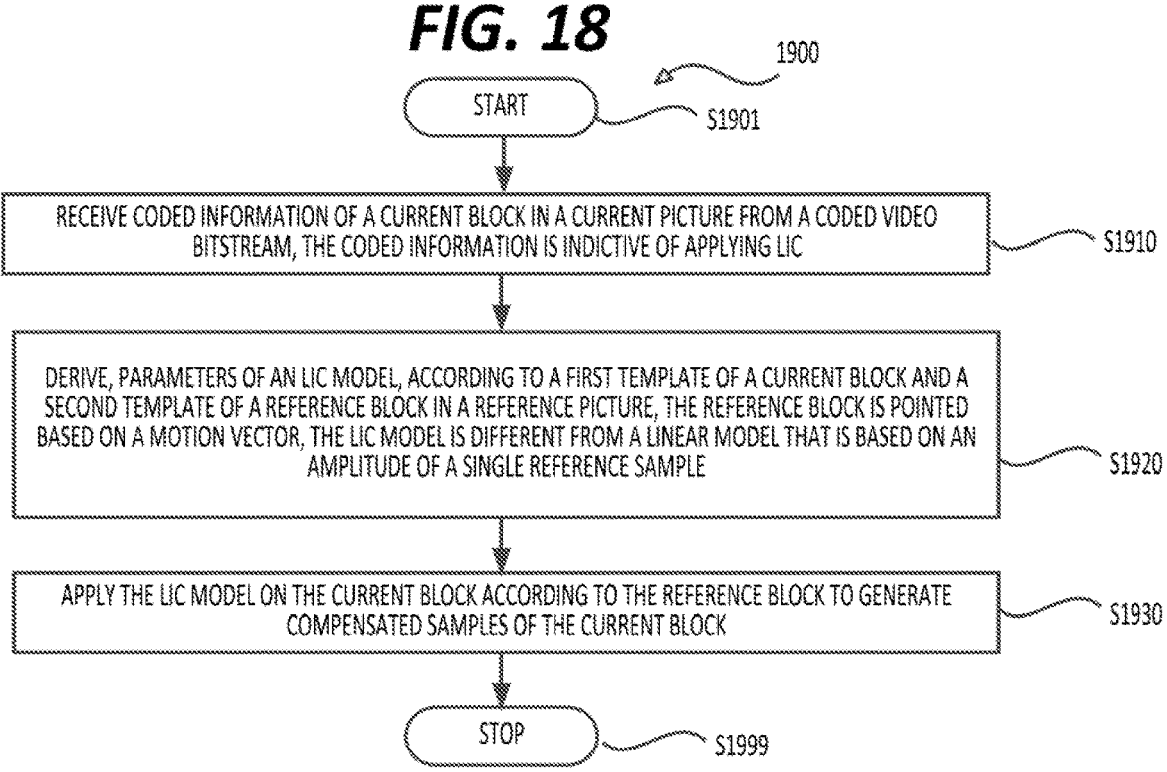
FIG. 19 shows a flow chart outlining another process according to some embodiment of the disclosure.

FIG. 19 shows a flow chart outlining a process (1900) according to an embodiment of the disclosure. The process (1900) can be used in a video decoder. In various embodiments, the process (1900) is executed by processing circuitry, such as the processing circuitry that performs functions of the video decoder (110), the processing circuitry that performs functions of the video decoder (210), and the like. In some embodiments, the process (1900) is implemented in software instructions, thus when the processing circuitry executes the software instructions, the processing circuitry performs the process (1900). The process starts at (S1901) and proceeds to (S1910).

At (S1910), coded information of a current block in a current picture is received from a coded video bitstream, the coded information is indicative of applying local illumination compensation (LIC).

At (S1920), parameters of an LIC model are derived according to a first template of a current block and a second template of a reference block in a reference picture. The reference block is determined based on a motion vector for the current block. The LIC model is different from a linear model that is based on an amplitude of a single reference sample.

At (S1930), the LIC model is applied on the current block according to the reference block to generate compensated samples of the current block.

It is noted that, in some embodiments, different equations can be used to model the LIC, the equations are different from the one used in CCLM. In one embodiment, a non-linear term can be used to form the equation, such as Eq. (8). In one example, the autocorrection matrix with LDL decomposition is used to obtain the parameters $\alpha_0$, $\alpha_1$, and $\beta$. In one embodiment, an n-tap spatial domain filter is applied on reference samples to form the equation, such as Eq. (9). In one embodiment, the n-tap filter shape could be but not limited to the diamond shape, cross shape, square shape, . . . , and the like, such as shown in FIGS. 13A-13C. In one embodiment, a syntax is signaled to indicate which n-tap filter shape is selected when the n-tap filter is used. In one embodiment, the spatial domain filter could be a symmetric filter with n/2 filter coefficients if n is an even number or (n+1)/2 filter coefficients if n is an odd number. In one embodiment, the non-linear term could also be added, such as Eq. (10). In another embodiment, more than one non-linear terms could be used and the number of non-linear terms should be smaller than or equal to the spatial filter tap number n. In another embodiment, the autocorrection matrix with LDL decomposition is used to obtain the parameters $\alpha_k$, and $\beta$. In another embodiment, an n-tap spatial domain filter is applied to reference samples to form the equation, such as Eq. (11). The autocorrection matrix with LDL decomposition is used to obtain the parameters $\alpha_k$, and $k\in[0, n-1]$. In one embodiment, the gradient value of reference sample could be used as input to form the equation, such as Eq. (12). The autocorrection matrix with LDL decomposition is used to obtain the parameters $\alpha$ and $\beta$. In one embodiment, the gradient value of reference sample can be added into the Eqs. (8)-(11). In one embodiment, pixel down-sampling in current block template and reference block template could be used for model derivation. In one embodiment, a syntax is signaled to indicate which modeling method is used for the coded block.

In some examples, the LIC model includes a non-linear term.

In some examples, the LIC model includes an n-tap spatial domain filter, and n is greater than 1. The n-tap spatial domain filter has a filter shape of at least one of a cross shape, a diamond shape, and a square shape.

To derive the parameters of the LIC model, in some examples, a mean square error minimization is performed according to the first template of the current block and the second template of the reference block to calculate filter coefficients of the n-tap spatial domain filter.

In some examples, the LIC model includes a gradient term that is linearly based on a gradient of a reference sample.

In some examples, a syntax is decoded, and the syntax is indicative of the LIC model from a plurality of candidates.

Then, the process proceeds to (S1999) and terminates.

The process (1900) can be suitably adapted. Step(s) in the process (1900) can be modified and/or omitted. Additional step(s) can be added. Any suitable order of implementation can be used.

The techniques described above, can be implemented as computer software using computer-readable instructions and physically stored in one or more computer-readable media. For example, FIG. 20 shows a computer system (2000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 20:
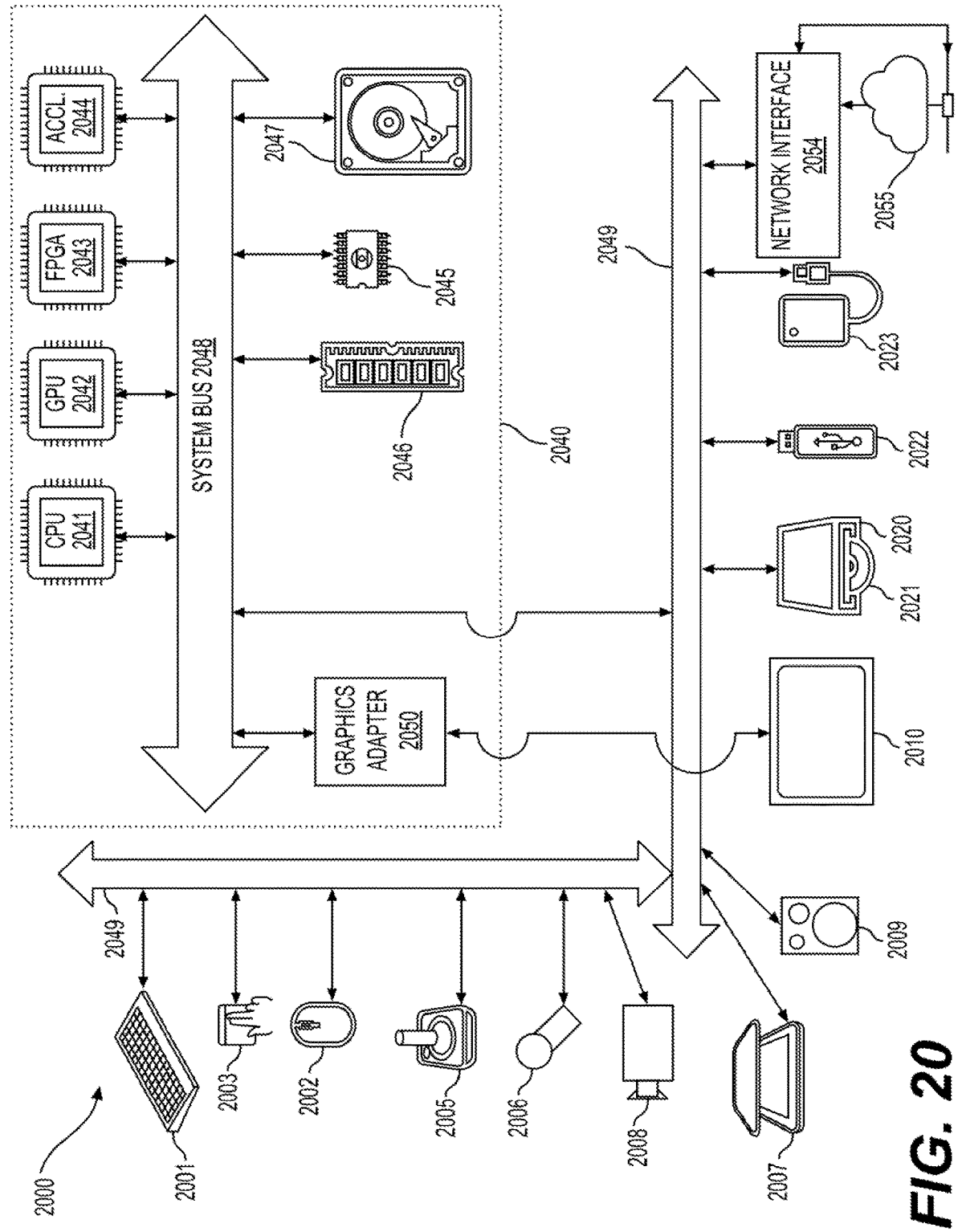
FIG. 20 is a schematic illustration of a computer system in accordance with an embodiment.

The components shown in FIG. 20 for computer system (2000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2000).

Computer system (2000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2001), mouse (2002), trackpad (2003), touch screen (2010), data-glove (not shown), joystick (2005), microphone (2006), scanner (2007), camera (2008).

Computer system (2000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2010), data-glove (not shown), or joystick (2005), but there can also be tactile feedback devices that do not serve as input devices), audio output devices (such as: speakers (2009), headphones (not depicted)), visual output devices (such as screens (2010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2000) can also include human accessible storage devices and their associated media such as optical media including CD/DVD ROM/RW (2020) with CD/DVD or the like media (2021), thumb-drive (2022), removable hard drive or solid state drive (2023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2000) can also include an interface (2054) to one or more communication networks (2055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2049) (such as, for example USB ports of the computer system (2000)); others are commonly integrated into the core of the computer system (2000) by attachment to a system bus as described below (for example Ethernet interface into a PC computer system or cellular network interface into a smartphone computer system). Using any of these networks, computer system (2000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2040) of the computer system (2000).

The core (2040) can include one or more Central Processing Units (CPU) (2041), Graphics Processing Units (GPU) (2042), specialized programmable processing units in the form of Field Programmable Gate Areas (FPGA) (2043), hardware accelerators for certain tasks (2044), graphics adapters (2050), and so forth. These devices, along with Read-only memory (ROM) (2045), Random-access memory (2046), internal mass storage such as internal non-user accessible hard drives, SSDs, and the like (2047), may be connected through a system bus (2048). In some computer systems, the system bus (2048) can be accessible in the form of one or more physical plugs to enable extensions by additional CPUs, GPU, and the like. The peripheral devices can be attached either directly to the core's system bus (2048), or through a peripheral bus (2049). In an example, the screen (2010) can be connected to the graphics adapter (2050). Architectures for a peripheral bus include PCI, USB, and the like.

CPUs (2041), GPUs (2042), FPGAs (2043), and accelerators (2044) can execute certain instructions that, in combination, can make up the aforementioned computer code. That computer code can be stored in ROM (2045) or RAM (2046). Transitional data can be also be stored in RAM (2046), whereas permanent data can be stored for example, in the internal mass storage (2047). Fast storage and retrieve to any of the memory devices can be enabled through the use of cache memory, that can be closely associated with one or more CPU (2041), GPU (2042), mass storage (2047), ROM (2045), RAM (2046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2000), and specifically the core (2040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2040) that are of non-transitory nature, such as core-internal mass storage (2047) or ROM (2045). The software implementing various embodiments of the present disclosure can be stored in such devices and executed by core (2040). A computer-readable medium can include one or more memory devices or chips, according to particular needs. The software can cause the core (2040) and specifically the processors therein (including CPU, GPU, FPGA, and the like) to execute particular processes or particular parts of particular processes described herein, including defining data structures stored in RAM (2046) and modifying such data structures according to the processes defined by the software. In addition or as an alternative, the computer system can provide functionality as a result of logic hardwired or otherwise embodied in a circuit (for example: accelerator (2044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving coded information of a current block in a current picture from a coded video bitstream, the coded information being indicative of applying local illumination compensation (LIC) on the current block in the current picture;
deriving, parameters of an LIC model, according to a first template of the current block and a second template of a reference block in a reference picture, the reference block being pointed based on a motion vector, the first template comprising a subset of reconstructed neighboring samples that are only one of one or more rows above and one or more columns left to the current block, and the second template comprising collocated samples to the subset of the reconstructed neighboring samples; and
applying the LIC model on the current block according to the reference block to generate compensated samples of the current block.

2. The method of claim 1, wherein the first template comprises a row of the reconstructed neighboring samples that are adjacent above the current block.

3. The method of claim 1, wherein the first template comprises a column of the reconstructed neighboring samples that are adjacent left to the current block.

4. The method of claim 1, wherein the first template comprises the one or more rows of the reconstructed neighboring samples that are above the current block.

5. The method of claim 1, wherein the first template comprises the one or more columns of the reconstructed neighboring samples that are left to the current block.

6. The method of claim 1, further comprising:
decoding a syntax that indicates the first template for selection from a plurality of template candidates.

7. The method of claim 1, further comprising:
determining to use the first template to derive the parameters of the LIC model according to at least one of a size of the current block, a shape of the current block, an aspect ratio of the current block, or the reconstructed neighboring samples.

8. The method of claim 1, further comprising:
classifying samples in a first block into at least a first class and a second class according to a classification criterion, the first block being one of the current block and the reference block, samples in a second block being classified according to collocated samples in the first block, the second block being another one of the current block and the reference block;
classifying template samples for the first block into at least the first class and the second class according to the classification criterion, template samples for the second block being classified according to corresponding collocated template samples for the first block;
deriving, first parameters of a first LIC model according to the first class of the template samples for the first block and the first class of the template samples for the second block;
deriving, second parameters of a second LIC model according to the second class of the template samples for the first block and the second class of the template samples for the second block; and
applying the first LIC model to the first class of samples in the current block and the second LIC model to the second class of samples in the current block to generate compensated samples of the current block.

9. The method of claim 8, wherein the first LIC model and the second LIC model have at least one different parameter.

10. The method of claim 8, wherein the classifying samples in the first block into at least the first class and the second class according to the classification criterion further comprises:
determining an amplitude threshold based on an average of sample values in the first block; and
classifying a sample into the first class or the second class based on a comparison of the sample with the amplitude threshold.

11. The method of claim 8, wherein the classifying samples in the first block into at least the first class and the second class according to the classification criterion further comprises:
determining a gradient threshold based on gradient values of samples in the first block; and
classifying a sample into the first class or the second class based on a comparison of a gradient value of the sample with the gradient threshold.

12. The method of claim 8, wherein the deriving the first parameters of the first LIC model further comprises:
deriving the first parameters of the first LIC model according to at least one of a least-mean-square operation and an autocorrelation matrix with LDL decomposition operation.

13. The method of claim 8, further comprising:
decoding a syntax indicative of applying more than one LIC model to generate the compensated samples of the current block.

14. The method of claim 1, wherein the LIC model is different from a linear model that is based on an amplitude of a single reference sample.

15. The method of claim 14, wherein the LIC model includes a non-linear term.

16. The method of claim 14, wherein the LIC model includes an n-tap spatial domain filter, and n is greater than 1.

17. The method of claim 16, wherein the n-tap spatial domain filter has a filter shape of at least one of a cross shape, a diamond shape, and a square shape.

18. The method of claim 16, wherein the deriving the parameters of the LIC model further comprises:
performing a mean square error minimization according to the first template of the current block and the second template of the reference block to calculate filter coefficients of the n-tap spatial domain filter.

19. The method of claim 14, wherein the LIC model includes a gradient term that is linearly based on a gradient of a reference sample.

20. The method of claim 14, further comprising:
decoding a syntax that is indicative of the LIC model from a plurality of candidates.

* * * * *